(12) United States Patent
Uemura et al.

(10) Patent No.: US 10,321,502 B2
(45) Date of Patent: Jun. 11, 2019

(54) TERMINAL DEVICE, BASE STATION APPARATUS, COMMUNICATION SYSTEM, COMMUNICATION CONTROL METHOD, AND INTEGRATED CIRCUIT

(71) Applicant: SHARP KABUSHIKI KAISHA, Sakai, Osaka (JP)

(72) Inventors: Katsunari Uemura, Sakai (JP); Hidekazu Tsuboi, Sakai (JP); Yasuyuki Kato, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/114,656

(22) PCT Filed: Jan. 21, 2015

(86) PCT No.: PCT/JP2015/051483
§ 371 (c)(1),
(2) Date: Jul. 27, 2016

(87) PCT Pub. No.: WO2015/115268
PCT Pub. Date: Aug. 6, 2015

(65) Prior Publication Data
US 2016/0353507 A1    Dec. 1, 2016

(30) Foreign Application Priority Data

Jan. 31, 2014 (JP) .................................. 2014-016260

(51) Int. Cl.
*H04W 76/15* (2018.01)
*H04W 76/34* (2018.01)
*H04W 80/02* (2009.01)

(52) U.S. Cl.
CPC ........... *H04W 76/15* (2018.02); *H04W 76/34* (2018.02); *H04W 80/02* (2013.01)

(58) Field of Classification Search
CPC . H04W 76/02–76/028; H04W 28/02–28/0294
See application file for complete search history.

(56) References Cited

U.S. PATENT DOCUMENTS

2014/0293903 A1* 10/2014 Kuo ...................... H04W 24/02
  370/329
2016/0182276 A1*  6/2016 Wu ...................... H04W 76/028
  370/225

(Continued)

OTHER PUBLICATIONS

3GPP TR 36.842 V1.0.0(Nov. 2013), "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", Technical Report, published on Nov. 2013, 68 pages.

(Continued)

*Primary Examiner* — Marcus Smith
(74) *Attorney, Agent, or Firm* — Birch, Stewart, Kolasch & Birch, LLP

(57) ABSTRACT

There are provided a terminal device, a base station apparatus, a communication system, a communication control method, and an integrated circuit, in all of which efficient communication control is possible in communication that uses multiple cells. In communication that uses first RLC which corresponds to a first cell group which includes at least the primary cell, second RLC which corresponds to a second cell group which does not include the primary cell, and one PDCP which belongs to the first cell group which processes pieces of data on the first RLC and the second RLC, the terminal device releases the second RLC based on a list that includes identifiers of data radio bearers relating to the second RLC, which is received from the base station apparatus.

4 Claims, 8 Drawing Sheets

(56) References Cited

U.S. PATENT DOCUMENTS

| | | | |
|---|---|---|---|
| 2016/0242193 A1* | 8/2016 | Hong | H04W 72/12 |
| 2016/0255665 A1* | 9/2016 | Futaki | H04W 72/0406 |
| | | | 370/329 |
| 2016/0286412 A1* | 9/2016 | Kim | H04W 76/025 |

OTHER PUBLICATIONS

3GPP TS 36.300 V11,3,0 (Sep. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, published on Sep. 2012, 205 pages.

NTT Docomo, Inc., "Deployment scenarios and design goals for dual connectivity", 3GPP TSG-RAN WG2 #81, R2-130444, St. Julian's, Malta, Jan. 28, 2013-Feb. 1, 2013, 6 pages.

3GPP, "3rd Generation Partnership Project; Technical Specification Group Radio Access Network; Evolved Universal Terrestrial Radio Access (E-UTRA); Radio Resource Control(RRC); Protocol specification (Release 12)," 3GPP TS 36.331, V12.0.0, Dec. 2013, pp. 1-349.

Ericsson, "L2 transport of SRBs and relation to RLF handling," R2-134221, 3GPP TSG-RAN WG2 #84, San Francisco, USA, Nov. 11-15, 2013, pp. 1-5.

Huawei et al., "BSR for small cell enhancement," R2-133883, 3GPP TSG-RAN WG2 Meeting #84, San Francisco, USA, Nov. 11-15, 2013, 4 pages.

Nsn et al., "BSR and SR for Dual Connectivity," R2-140043, 3GPP TSG-RAN WG2 Meeting #85, Prague, Czech Republic, Feb. 10-14, 2014 (downloaded on Jan. 30, 2014), 5 pages.

NTT Docomo & NEC (WI Rapporteurs) et al., "Stage 2 Changes for Dual Connectivity," R2-140049, 3GPP TSG-RAN WG2 Meeting #85, Prague, Czech Republic, Feb. 10-14, 2014 (downloaded on Jan. 30, 2014), 45 pages.

3GPP TS 36.331 V11.6.0 (Dec. 2013), 3GPP. Dec. 2013, pp. 63-66, 219-220.

Potevio, Further consideration of BSR in dual MAC for architectures 1A and 3C [online], 3GPP TSG-RAN WG#85 R2-140405, Internet <URL:http://www.3gpp.org/ftp/tsg_ran/WG2_RL2/TSGR2_85/Docs/R2-140405.zip>, Jan. 30, 2014.

* cited by examiner

TERMINAL DEVICE, BASE STATION APPARATUS, COMMUNICATION SYSTEM, COMMUNICATION CONTROL METHOD, AND INTEGRATED CIRCUIT

TECHNICAL FIELD

Embodiments of the present invention relate to a technology associated with a terminal device, a base station apparatus, a communication system, a communication control method, and an integrated circuit, in all of which efficient communication control is possible.

This application claims the benefit of Japanese Priority Patent Application JP 2014-016260 filed Jan. 31, 2014, the entire contents of which are incorporated herein by reference.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency or time units, which is referred to as an orthogonal frequency-division multiplexing (OFDM) communication scheme or a resource block.

Furthermore, in 3GPP, discussions on Advanced EUTRA that realizes higher-speed data transfer have taken place. As one technology relating to Advanced EUTRA, carrier aggregation (CA) is employed. The carrier aggregation is a technology in which multiple different frequencies (which are referred to as component carriers (CCs)) are aggregated for use and thus a transfer rate is improved (NPL 1, Chapter 5.5).

Furthermore, a terminal device that is communicating with a base station apparatus using the carrier aggregation groups frequencies (component carriers) of one or multiple cells and manages a state of an uplink transmission timing (Timing Advance (TA)) for every group. The group in which the uplink transmission timing indicates the frequencies (the component carriers) of the same cell is also referred to as a timing alignment group (TAG) (NPL 1, Chapter 10.1.2.7).

In EUTRA, a network is mainly assumed in which the base station apparatuses have almost the same cell constitution (cell size). However, in Advanced EUTRA, a network (heterogeneous wireless network or heterogeneous network) is assumed in which the base station apparatuses (the cells) having different constitutions are present in a mixed manner in the same area and a control method that is adapted for this network has been under study.

A technology (dual connectivity), in which, as in the heterogeneous network, in a communication system in which a cell (a macro cell) with a large radius and a cell (a small cell) with a radius smaller than that of the macro cell are arranged in a mixed manner, the terminal device makes connections to multiple cells of the base station apparatus at the same time and performs communication (NPL 2), has been under study.

Furthermore, in the base station apparatus, one cell is constituted by combining one downlink component carrier and one uplink component carrier. Moreover, in the base station apparatus, one cell can be constituted as only one downlink component carrier.

CITATION LIST

Non-Patent Document

[Non-Patent Document 1] NPL 1: 3GPP TS 36.300 V11.3.0 (2012-09) http://www.3gpp.org/ftp/Specs/archive/36_series/36.300/

[Non-Patent Document 2] NPL 2: 3GPP TS 36.842 V1.0.0 (2013-11) http://www.3gpp.org/ftp/Specs/archive/36_series/36.842/

DISCLOSURE OF THE INVENTION

Problems to be Solved by the Invention

However, as disclosed in NPL 2, in order to realize the dual connectivity, there is a need for a radio configuration of a higher layer (a MAC layer, an RLC layer, or a PDCP layer), as well as a radio configuration of a physical layer (PHY layer). For this reason, in a case where a cell that is used in the dual connectivity is changed or deleted, an influence that this has on the radio configuration of the higher layer as well as the radio configuration of the physical layer has to be considered, but this problem has not yet been under study. Particularly, because there is a new need for the radio configurations of the higher layers in the dual connectivity, there is a need to determine a correspondence relationship between the radio configuration of the physical layer and the radio configuration of the higher layer, but this problem has not yet been under study.

An object of embodiments of the present invention, which were contrived in view of the problems described above, is to deal with at least one of the problems described above by providing a technology relating to a terminal device, a base station apparatus, a communication system, a communication control method, and an integrated circuit, in all of which efficient communication control is possible.

Means for Solving the Problems

According to an embodiment of the present invention, there is provided a terminal device that makes a connection to a base station apparatus using multiple serving cells that include a primary cell, in which, in communication that uses first RLC which corresponds to a first cell group which includes at least the primary cell, second RLC which corresponds to a second cell group which does not include the primary cell, and one PDCP which belongs to the first cell group which processes pieces of data on the first RLC and the second RLC, a list of data radio bearers that includes identifiers of the data radio bearers relating to both of the first cell group and the second cell group is received from the base station apparatus, and, based on the received list, the second RLC is released.

Furthermore, the terminal device according to the embodiment of the present invention may be constituted in such a manner that the communication that uses the first RLC, the second RLC, and the PDCP is changed to communication that uses the first RLC and the PDCP by releasing the second RLC that corresponds to the identifier of the data radio bearer that is included in the list.

Furthermore, according to another embodiment of the present invention, there is provided a base station apparatus that makes a connection to a terminal device which uses multiple serving cells that include a primary cell, in which, a configuration of first RLC that corresponds to the first cell group which includes at least the primary cell, a configuration of second RLC that corresponds to a second cell group which does not include the primary cell, and a configuration of one PDCP that belongs to the first cell group which processes pieces of data on the first RLC and the second RLC are transmitted, and the terminal device is caused to perform communication that uses the first RLC, the second RLC, and the PDCP, and in which a list of data radio bearers that includes identifiers of the data radio bearers relating to both of the first cell group and the second cell group is transmitted, and the terminal device is caused to release the second RLC.

Furthermore, the base station apparatus according to the embodiment of the present invention may be constituted in such a manner that the terminal device that performs communication that uses the first RLC, the second RLC, and the PDCP is caused to change the communication that is performed, to communication that uses the first RLC and the PDCP, by transmitting the identifier of the data radio bearer that corresponds to the second RLC, in a state of being included in the list.

Furthermore, according to still another embodiment of the present invention, there is provided a communication system in which a base station apparatus and a terminal device make connections to each other using multiple serving cells that include a primary cell, in which the base station apparatus transmits a configuration of first RLC that corresponds to a first cell group which includes at least the primary cell, a configuration of second RLC that corresponds to a second cell group which does not include the primary cell, and a configuration of one PDCP that belongs to the first cell group which processes pieces of data on the first RLC and the second RLC, and in which, in communication that uses the first RLC, the second RLC, and the PDCP, the terminal device receives a list of data radio bearers that includes identifiers of the data radio bearers relating to both of the first cell group and the second cell group, from the base station apparatus, and, based on the received list, releases the second RLC.

Furthermore, according to still another embodiment of the present invention, there is provided a communication control method for use in a terminal device that makes a connection to a base station apparatus using multiple serving cells that include a primary cell, the communication control method at least including: a step of receiving a list of data radio bearers that includes identifiers of the data radio bearers relating to both of a first cell group and a second cell group, from the base station apparatus; and a step of releasing second RLC based on the received list, in which communication uses first RLC which corresponds to the first cell group which includes at least the primary cell, the second RLC which corresponds to the second cell group which does not include the primary cell, and one PDCP which belongs to the first cell group which processes pieces of data on the first RLC and the second RLC.

Furthermore, the communication control method for use in the terminal device according to the embodiment of the present invention may further include a step of changing the communication that uses the first RLC, the second RLC, and the PDCP, to communication that uses the first RLC and the PDCP by releasing the second RLC that corresponds to the identifier of the data radio bearer that is included in the list.

Furthermore, according to still another embodiment of the present invention, there is provided a communication control method for use in a base station apparatus that makes a connection to a terminal device which uses multiple serving cells that include a primary cell, the communication control method at least including: a step of transmitting a configuration of first RLC that corresponds to the first cell group which includes at least the primary cell, a configuration of second RLC that corresponds to a second cell group which does not include the primary cell, and a configuration of one PDCP that belongs to the first cell group which processes pieces of data on the first RLC and the second RLC; and a step of causing the terminal device that performs communication that uses the first RLC, the second RLC, and the PDCP, to transmit a list of data radio bearers that includes identifiers of the data radio bearers relating to both of the first cell group and the second cell group, in order to release the second RLC.

Furthermore, the communication control method for use in the base station apparatus according to the embodiment of the present invention may further include a step of transmitting the identifier of the data radio bearer that corresponds to the second RLC, with the identifier being included in the list, in order to cause the terminal device that performs communication that uses the first RLC, the second RLC, and the PDCP, to change the communication that is performed, to communication that uses the first RLC and the PDCP.

Furthermore, according to still another embodiment of the present invention, there is provided an integrated circuit that is built into a terminal device that makes a connection to a base station apparatus using multiple serving cells that include a primary cell, the integrated circuit causing the terminal device at least to perform: a function of performing communication that uses first RLC which corresponds to a first cell group which includes at least the primary cell, second RLC which corresponds to a second cell group which does not include the primary cell, and one PDCP which belongs to the first cell group which processes pieces of data on the first RLC and the second RLC; a function of receiving a list of data radio bearers that includes identifiers of the data radio bearers relating to both of the first cell group and the second cell group, from the base station apparatus; and a function of releasing the second RLC based on the received list.

Furthermore, according to still another embodiment of the present invention, there is provided an integrated circuit that is built into a base station apparatus that makes a connection to a terminal device which uses multiple serving cells that include a primary cell, the integrated circuit causing the base station apparatus at least to perform: a function of transmitting a configuration of first RLC that corresponds to the first cell group which includes at least the primary cell, a configuration of second RLC that corresponds to a second cell group which does not include the primary cell, and a configuration of one PDCP that belongs to the first cell group which processes pieces of data on the first RLC and the second RLC; and a function of causing the terminal device that performs communication that uses the first RLC, the second RLC, and the PDCP, to transmit a list of data radio bearers that includes identifiers of the data radio bearers relating to both of the first cell group and the second cell group, in order to release the second RLC.

In the present specification, each of the embodiments is disclosed in terms of the technology relating to the terminal device, the base station apparatus, the communication system, the communication control method, and the integrated circuit, in all of which the efficient communication control is possible, but a communication scheme that is applicable to each of the embodiments is not limited to EUTRA or Advanced EUTRA.

For example, the technology that is described in the present specification can be used in various communication systems, such as a code division multiple access (CDMA)

system, a time division multiple access (TDMA) system, a frequency division multiple access (FDMA) system, an orthogonal FDMA (OFDMA) system, a single carrier FDMA (SC-FDMA) system, and other systems. Furthermore, in the specification, the system and the network can be used synonymously.

Effects of the Invention

According to embodiments of the present invention, a technology associated with a terminal device, a base station apparatus, a communication system, a communication control method, and an integrated circuit, in all of which efficient communication control is possible, can be provided.

MODE FOR CARRYING OUT THE INVENTION

Figure 1:
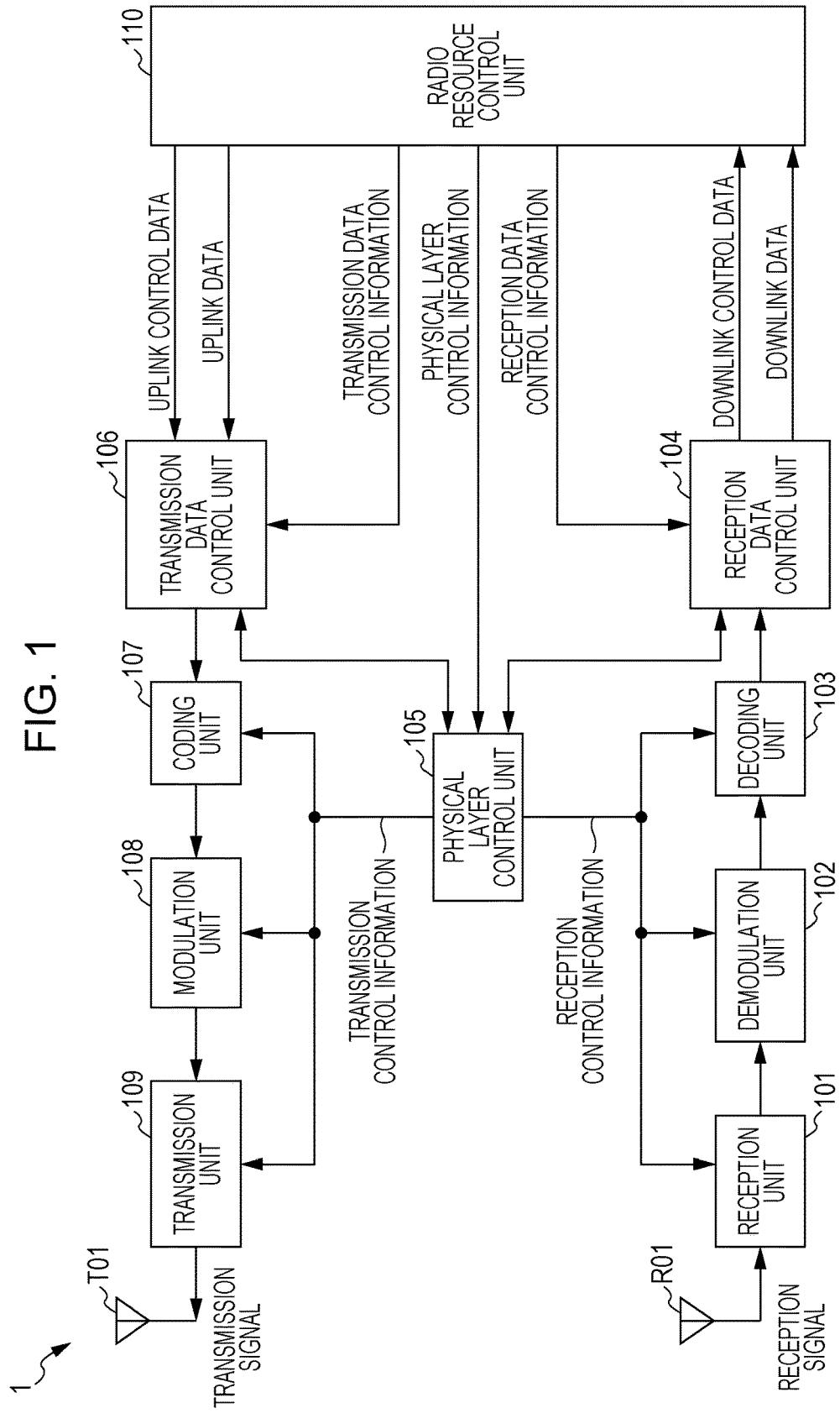
FIG. 1 is a block diagram illustrating a schematic constitution of a terminal device according to an embodiment of the present invention.

Before describing each embodiment of the present invention, a technology relating to each embodiment of the present invention will be described briefly below.

[Physical Channel/Physical Signal]

Physical channels and physical signals that are mainly used in EUTRA and Advanced EUTRA are described. A channel means a medium that is used for signal transmission and reception, and a physical channel means a physical medium that is used for signal transmission and reception.

According to the present invention, the physical channel and the signal can be used synonymously. There is a likelihood that in EUTRA and Advanced EUTRA, the physical channel will be added in future or an architecture or format type thereof will be changed or added, but this change or addition does not have any influence on a description of each embodiment of the present invention.

In EUTRA and Advanced EUTRA, scheduling of the physical channel or the physical signal is managed using a radio frame. One radio frame is 10 ms, and one radio frame is constituted from 10 subframes. Additionally, one subframe is constituted from two slots (that is, one subframe is 1 ms and one slot is 0.5 ms). Furthermore, management is performed using a resource block as a minimum unit of scheduling for allocating the physical channel. The resource block is defined by a fixed frequency domain that is constituted from a set of multiple subcarriers (for example, 12 subcarriers) along a frequency axis and by a domain that is constituted from a fixed transmission time interval (1 slot).

A synchronization signal is constituted from 3 types of primary synchronization signals and a secondary synchronization signal that is constituted from 31 types of codes which are alternately arranged in the frequency domain. With a combination of these signals, the primary synchronization signal and the secondary synchronization signal, 504 cell identifiers (physical cell identity (PCI)) for identifying a base station apparatus and a frame timing that is used for wireless synchronization are indicated. A terminal device specifies a physical cell ID of the synchronization signal that is received through cell search.

A physical broadcast channel (PBCH) is transmitted for the purpose of notifying (configuring) a control parameter (broadcast information (system information)) that is used in a shared manner in terminal devices within a cell. For the broadcast information that is not notified on the physical broadcast information channel, a radio resource in which the broadcast information is transmitted on a physical downlink control channel is notified to the terminal device within the cell, and in the notified radio resource, a layer 3 message (system information) for notifying the broadcast information using a physical downlink shared channel is transmitted.

As pieces of broadcast information, a cell global identifier (CGI) indicating a cell-dedicated identifier, a tracking area identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, the cell-specific reference signal (RS) is a pilot signal that is transmitted with a prescribed power for every cell, and is a downlink reference signal that is periodically iterated in the frequency domain and the time domain based on a prescribed rule. The terminal device measures received quality for every cell by receiving the cell-specific RS. Furthermore, the terminal device also uses a downlink cell-specific RS as a reference signal for demodulation of the physical downlink control channel that is transmitted at the same time that the cell-specific RS is transmitted, or of the physical downlink shared channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as a channel state information reference signal (CSI-RS). Furthermore, the downlink reference signal that is dedicated to the terminal device is referred to as UE-specific reference signal (URS) or demodulation RS (DMRS), and is referred to for channel compensation processing of the channel that is to be performed when demodulating the physical downlink control channel or the physical downlink shared channel.

A physical downlink control channel (PDCCH) is transmitted in several OFDM symbols (for example, 1 to 4 OFDM symbols) starting from the head of each subframe. An enhanced physical downlink control channel (EPDCCH) is a physical downlink control channel that is allocated to the OFDM symbols to which the physical downlink shared channel (PDSCH) is allocated. The PDCCH or the EPDCCH is used for the purpose of notifying radio resource allocation information in accordance with the scheduling by the base station apparatus for the terminal device, or information indicating an amount of adjustment for an increase or decrease in transmit power. Unless otherwise specified, the physical downlink control channel (PDCCH) that will be described below means both of the physical channels, the PDCCH and the EPDCCH. The bank 13 preferably contains a resin and titanium oxide which functions as a photocatalyst from the aspect that it is possible to easily and stably form a light-transmission suppressing layer 10 described below.

The terminal device monitors a physical downlink control channel that is destined for the terminal device itself before transmitting and receiving the layer 3 message (paging, a handover command, or the like) that is downlink data or downlink control data, and receives the physical downlink control channel that is destined for the terminal device itself. Thus, the terminal device needs to acquire from the physical downlink control channel the radio resource allocation information that is referred to as an uplink grant at the time of the transmission and as a downlink grant (a downlink assignment) at the time of the reception. Moreover, in addition to being transmitted in the OFDM symbol described above, the physical downlink control channel is also able to be constituted to be transmitted in a region of the resource block that is dedicatedly allocated from the base station apparatus to the terminal device.

A physical uplink control channel (PUCCH) is used for an acknowledgement response (Acknowledgement/Negative Acknowledgement (ACK/NACK)) for reception of data that is transmitted on the physical downlink shared channel, for downlink channel (channel state) information (Channel State Information (CSI)), or for making an uplink radio resource allocation request (a radio resource request, a scheduling request (SR)).

Pieces of CSI include a channel quality indicator (CQI), a precoding matrix indicator (PMI), a precoding type indicator (PTI), and a rank indicator (RI). Each indicator may be expressed as indication.

The physical downlink shared channel (PDSCH) is also used for notifying the terminal device of the broadcast information (system information) that is not notified, as the layer 3 message, by paging or on the physical broadcast information channel, as well as the downlink data. The radio resource allocation information of the physical downlink shared channel is indicated with the physical downlink control channel. The physical downlink shared channel is transmitted in a state of being arranged in OFDM symbols other than the OFDM symbols in which the physical downlink control channel is transmitted. That is, the physical downlink shared channel and the physical downlink control channel are time-multiplexed within one subframe.

Uplink data and uplink control data are able to be mainly transmitted on a physical uplink shared channel (PUSCH), and the PUSCH is able to include control data, such as the received quality in the downlink or an ACK/NACK. Furthermore, the physical uplink shared channel (PUSCH) is also used for the terminal device to notify the base station apparatus of uplink control information as the layer 3 message, as well as the uplink data. Furthermore, as is the case in the downlink, the radio resource allocation information of the physical uplink shared channel is indicated with the physical downlink control channel.

Included in an uplink reference signal (which is also referred to as an uplink pilot signal or an uplink pilot channel) are a demodulation reference signal (DMRS) that is used for the base station apparatus to demodulate the physical uplink control channel (PUCCH) and/or the physical uplink shared channel (PUSCH) and a sounding reference signal (SRS) that is used for the base station apparatus to mainly estimate an uplink channel state.

Furthermore, as the sounding reference signal, there are a periodic sounding reference signal (periodic SRS) that is periodically transmitted and an aperiodic sounding reference signal (aperiodic SRS) that is transmitted when the base station apparatus gives an instruction to do so.

A physical random access channel (PRACH) is a channel that is used for notifying (configuring) a preamble sequence and has a guard time. The preamble sequence is constituted in such a manner that information is notified to the base station apparatus with multiple sequences. For example, in a case where 64 types of sequences are prepared, 6-bit information can be indicated to the base station apparatus. The physical random access channel is used as means by which the terminal device has access to the base station apparatus.

The terminal device transmits the preamble sequence using the radio resource for the physical random access channel that is configured by the base station apparatus. The terminal device that receives the transmission timing adjustment information configures a transmission timing timer that counts an available time of the transmission timing adjustment information which is configured to be in common use by the broadcast information (or is dedicatedly configured with the layer 3 message), and manages an uplink state as a transmission timing adjusted state during the available time of the transmission timing timer (while the counting is in progress) and as a transmission timing non-adjusted state (a transmission timing unadjusted state) during a duration other than the non-available duration (while the counting is not in progress).

The terminal device uses the physical random access channel in order to make the uplink radio resource request when the physical uplink control channel is not configured, to make a request to the base station apparatus for the transmission timing adjustment information (which is also referred to as timing advance (TA)) indispensable for adjusting an uplink transmission timing to a reception timing window of the base station apparatus, or to perform an operation like this. Furthermore, the base station apparatus can also make a request to the terminal device for starting of a random access procedure using the physical downlink control channel.

The layer 3 message is a message that is handled with a protocol of a control-plane (C-Plane) (CP) that is exchanged in radio resource control (RRC) layers of the terminal device and the base station apparatus. The layer 3 message and RRC signaling or an RRC message can be used synonymously. Moreover, in contrast with the control-plane, a plane of which a protocol is for handling user data is referred to as a user-plane (U-Plane) (UP).

Moreover, detailed descriptions of physical channels or physical signals other than these are omitted because they have no relationship with each embodiment of the present invention. As physical channels or physical signals of which the descriptions are omitted, there are a physical control format indicator channel (PCFICH), a physical hybrid ARQ indicator channel (PHICH), a physical multicast channel (PMCH) and the like.

[Wireless Network]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. When cells that are covered by different types of base station apparatuses or that have different radii are present in a mixed manner in an area where the same frequency or different frequencies are available and one communication system is formed, this wireless network is referred to as a heterogeneous network.

The terminal device regards the inside of the cell as the communication area, and operates. When the terminal device moves from a certain cell to a different cell, the terminal device moves to a separate suitable cell by a cell re-selection procedure at the time of a non-wireless connection (an idle state) and by a handover procedure at the time of a wireless connection (in a connected state). The suitable cell is a cell in which it is determined that generally, the access by terminal device is not prohibited based on information that is designated from the base station apparatus and on an access class of the terminal device, and in which the received quality in the downlink satisfies a prescribed condition.

The base station apparatus manages a certain cell that is an area where the terminal device is able to communicate with the base station apparatus, from one frequency to another. One base station apparatus may manage multiple cells. Cells are categorized into multiple types according to the size (cell size) of an area where communication with the terminal device is possible. For example, cells are categorized into macro cells and small cells. The small cell is a cell that has a coverage area with a radius of several meters to several-ten meters. Furthermore, the small cells are categorized femto cells, pico cells, namo cells, and the like according to the sizes of their coverage areas.

When the terminal device is able to communicate with a certain base station apparatus, among cells that are covered by the certain base station apparatus, a cell that is configured in such a manner that the cell is used for communication with the terminal device is referred to as a serving cell, the other cells that are not used for the communication are referred to as neighboring cells.

[Carrier Aggregation]

A technology (carrier aggregation) in which frequencies (component carriers or frequency bands) in multiple different frequency bands are aggregated and are handled as if they were one frequency (frequency band) may be applied to the terminal device and the base station apparatus. In the carrier aggregation, as component carriers, there are an uplink component carrier that corresponds to the uplink and a downlink component carrier that corresponds to the downlink. In the present specification, the frequency and the frequency band are used synonymously.

For example, in a case where with the carrier aggregation, component carriers in a frequency bandwidth of 20 MHz are aggregated into 5 component carriers, the terminal device that has the capability to enable the carrier aggregation performs transmission and reception with the 5 component carriers being regarded as a frequency bandwidth of 100 MHz. Moreover, although the component carriers are aggregated are contiguous frequencies, all or some of the component carriers may be non-contiguous frequencies. For example, in a case where available frequency bands are an 800 MHz band, a 2 GHz band, and a 3.5 GHz band, one component carrier may be transmitted in the 800 MHz band, one component in the 2 GHz band, and finally the third component in the 3.5 GHz band.

Furthermore, it is also possible to aggregate that multiple component carriers that are the same frequencies which are contiguous or non-contiguous. A frequency bandwidth of each component carrier may be a frequency bandwidth (for example, 5 MHz or 10 MHz) smaller than a frequency bandwidth (for example, 20 MHz) in which the terminal device is able to perform reception, and the frequency bandwidths that are to be aggregated may be different from each other. It is desirable that the frequency bandwidth is equal to any one of the frequency bandwidths in a cell in the related art, considering backward compatibility, but may be a frequency bandwidth that is different from the frequency bandwidth in the cell in the related art.

With the carrier aggregation, component carriers (carrier types) may be aggregated that does not maintain the backward compatibility. The component carrier that does not maintain the backward compatibility is also referred to as a new carrier type (NCT). Moreover, it is desirable that the number of uplink component carriers that are allocated to (configured for or added to) the terminal device by the base station apparatus is equal to or smaller than the number of downlink component carriers, but limitation to this is not necessarily imposed.

The terminal device and the base station apparatus manages as a primary cell (PCell) a cell that is constituted from downlink component carriers which are connected, in a cell-specific manner, to a certain uplink component carrier and the uplink component carrier. Furthermore, the terminal device and the base station apparatus manages as a secondary cell (SCell) a cell that is constituted from component carriers other than those from which the primary cell are constituted. The frequency in the primary cell is referred to as a primary frequency, and the frequency in the secondary cell is referred to as a secondary frequency. The frequency in the primary cell and the frequencies in multiple secondary cells are all different from each other.

The terminal device may perform reception of a paging message, detection of update of the broadcast information, an initial access procedure, configuration of security information, and the like in the primary cell, and on the other hand, may not perform these operations in the secondary cell. The primary cell and the secondary cell are collectively referred to as serving cells. That is, in a case where multiple component carriers (cells) are aggregated, the terminal device retains multiple serving cells.

With regard to a state of the serving cell, a state where the serving cell is activated is also referred to as an activated state, and a state where the serving cell is deactivated is also referred to as a deactivated state. The primary cell is other than a target for control of activation and deactivation (more precisely, the primary cell is regarded as being necessarily activated), but the secondary cell retains a state of the cell, in accordance with activities, which is called the activation and the deactivation.

The state of the serving cell is also a case where a change of the state is explicitly designated (notified or indicated) by the base station apparatus, or also a case where the state is changed based on timer information (deactivation timer) that is timed by the terminal device for every component carrier (cell).

Moreover, the carrier aggregation is for communication by multiple serving cells that uses multiple component carriers (frequency bands), and is also referred to as cell aggregation. Moreover, the terminal device may be wirelessly connected to the base station apparatus through a relay station apparatus (or a repeater) for every frequency. That is, the base station apparatus according to each embodiment of the present invention can be replaced with the relay station apparatus.

In the carrier aggregation, both of the non-contention-based random access procedure and the contention based random access procedure are supported in the primary cell, but because an uplink transmission timing of the secondary cell is different from that in the primary cell, in a case where the random access procedure is executed in the secondary cell, (this is referred to as multi-TA or Multiple TA), only non-contention-based random access procedure is supported in the secondary cell. Moreover, in the carrier aggregation, a response (a random access response) to the physical random access channel (the preamble sequence) that is transmitted by the terminal device in the uplink in the secondary cell is transmitted from the base station apparatus in the downlink in the primary cell.

[Dual Connectivity]

For the dual connectivity, the terminal device makes a connection to multiple base station apparatuses. The multiple base station apparatuses, for example, are constituted from base station apparatuses that constitute the macro cell and other base station apparatuses that constitute the small cell. Furthermore, the multiple base station apparatuses are constituted from base station apparatuses that constitute the small cell and other base station apparatuses that constitute a different small cell.

An connection in which, in this manner, the terminal device uses radio resources in multiple cells that belong to each of the multiple base station apparatuses and thus performs the transmission and reception is referred to as the dual connectivity, and the connection between the terminal device and the multiple base station apparatuses using a technology for realizing the dual connectivity is described using the expressions "using the dual connectivity", and "connection with the dual connectivity" and expressions similar to the expressions described above. The idea that the cell to be used for the connection is managed with a different frequency is the baseline of the present technology, but even if the cell is managed with the same frequency, it is possible to use the same technology.

Moreover, the carrier aggregation is different from the connection using the dual connectivity in that one base station apparatus manages multiple cells and thus the one base station apparatus is able to control each cell in a concentrated manner, and in that there is no need to consider an influence of delay on a backbone circuit among multiple cells. In other words, the carrier aggregation is a technology that connects one terminal device and one base station apparatus through multiple cells, and in contrast with this, the dual connectivity is a technology that connects one terminal device and multiple base station apparatuses through multiple cells.

In the terminal device and the base station apparatus, the technology that is applied to the carrier aggregation can be applied to the dual connectivity. For example, in the terminal device and the base station apparatus, technologies, such as management (addition, deletion, change, and the like) of the primary cell and the secondary cell, configuration of a measurement method and a measurement event in accordance with the carrier aggregation, and activation/inactivation, may be applied to a cell that is connected using the dual connectivity.

A connection path among multiple base station apparatuses that constitute a cell that is connected using the dual connectivity is referred to as a base station interface. Furthermore, the base station interface is also referred to as an X2 interface or an Xn interface in EUTRA.

Figure 6:
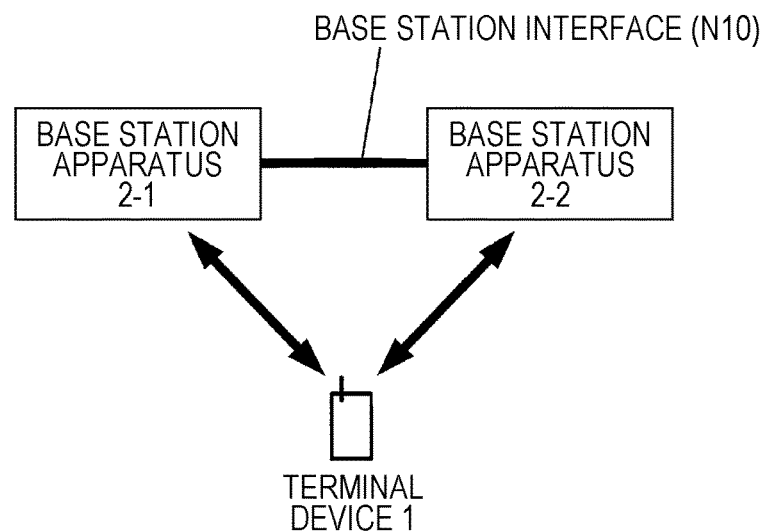
FIG. 6 is a diagram illustrating one example of a connection between the terminal device and the base station apparatus that use dual connectivity.

FIG. 6 is a diagram illustrating an example of a case where the terminal device 1 and the base station apparatus 2 are connected using the dual connectivity. The terminal device 1 and the base station apparatus 2 (a base station apparatus 2-1 and a base station apparatus 2-2) each are connected through an independent cell, and the terminal device 1 is able to perform concurrent reception from and/or concurrent transmission to the cell of each base station apparatus 2. Furthermore, a base station interface N10 is connected between a base station apparatus 2-1 and the base station apparatus 2-2.

At this time, a cell group that is constituent from cells that are used for connection to the base station apparatus 2-1 (the macro cell) is referred to as a master eNB cell group (MCG), and a cell group that is constituted from cells that are used to the base station apparatus 2-2 (the small cell) is referred to as a secondary eNB cell group (SCG).

Figure 7:
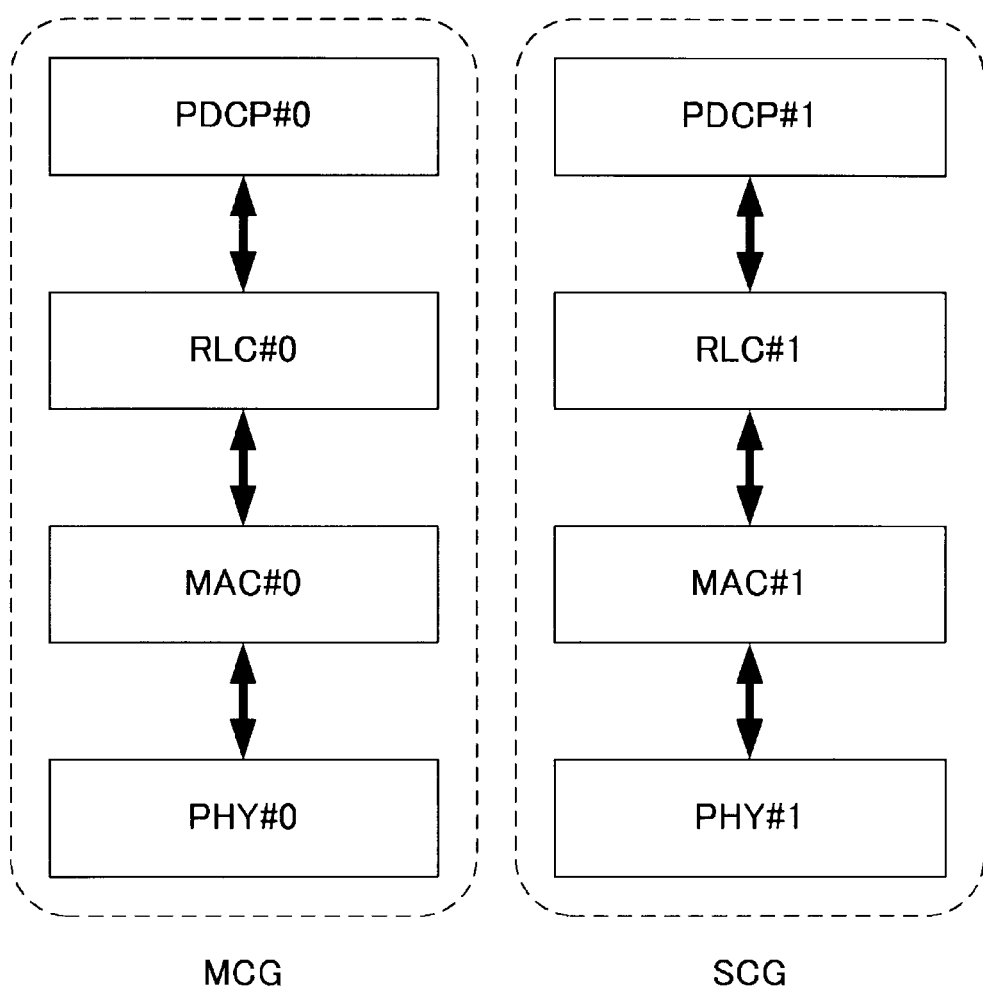
FIG. 7 is a diagram illustrating one example of a protocol architecture of a user-plane in the terminal device that uses the dual connectivity.

FIG. 7 is a diagram illustrating an example of the protocol architecture of the user-plane in the terminal device 1 that uses the dual connectivity.

In FIG. 7, the terminal device 1 includes as protocols of the user-plane a PDCP layer, an RLC layer, a MAC layer, and a PHY layer (PDCP #0, RLC #0, MAC #0, and PHY #0) that correspond to transmission of user data from the base station apparatus 2-1 (MCG), and a PDCP layer, an RLC layer, a MAC layer, and a PHY layer (PDCP #1, RLC #1, MAC #1, and PHY #1) that correspond to transmission of user data from the base station apparatus 2-2 (SCG).

Figure 8:
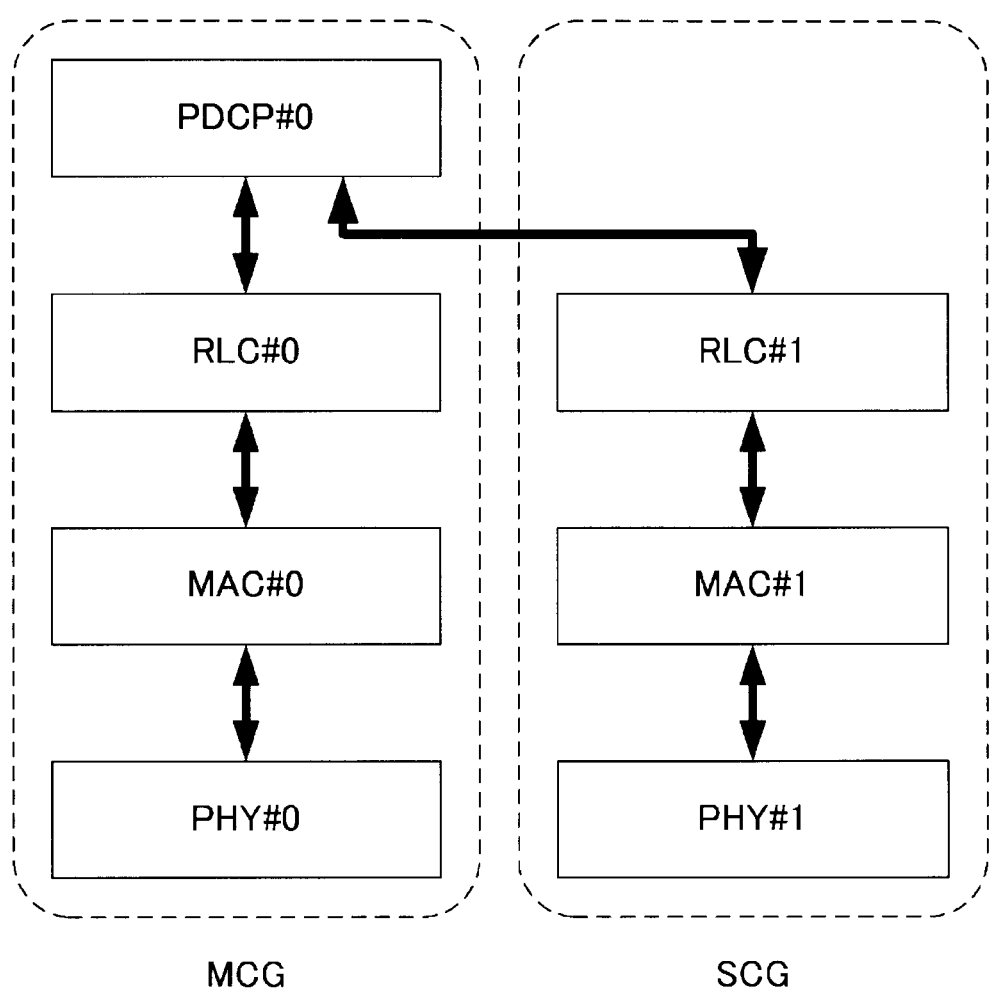
FIG. 8 is a diagram illustrating another example of a protocol architecture of a user-plane in the terminal device that uses the dual connectivity.

FIG. 8 illustrates another example of the protocol architecture of the user-plane in the terminal device 1 that uses the dual connectivity.

In FIG. 8, the terminal device 1 includes as the protocols of the user-plane the PDCP layer, the RLC layer, the MAC layer, and the PHY layer (PDCP #0, RLC #0, MAC #0, and PHY #0) that correspond to the transmission of the user data from the base station apparatus 2-1 (MCG), and the RLC layer, the MAC layer, and the PHY layer (RLC #1, MAC #1, and PHY #1) that correspond to the transmission of the user data from the base station apparatus 2-2 (SCG) in FIG. 8. Moreover, in FIG. 8, for the PDCP layer that corresponds to the transmission of the user data form the base station apparatus 2-2 (SCG), the PDCP (PDCP #0) on the MCG side is included.

Furthermore, although the present technology is referred to using the term dual connectivity, the number of the base station apparatuses 2 that are connected to the terminal device 1 is not limited to 2, and the terminal device 1 is also able to make a connection to three or more base station apparatuses 2.

[User-Plane Protocol Control]

A method of controlling user-plane protocols for the terminal device 1 and the base station apparatus 2 will be described referring to FIGS. 9 to 11.

Figure 9:
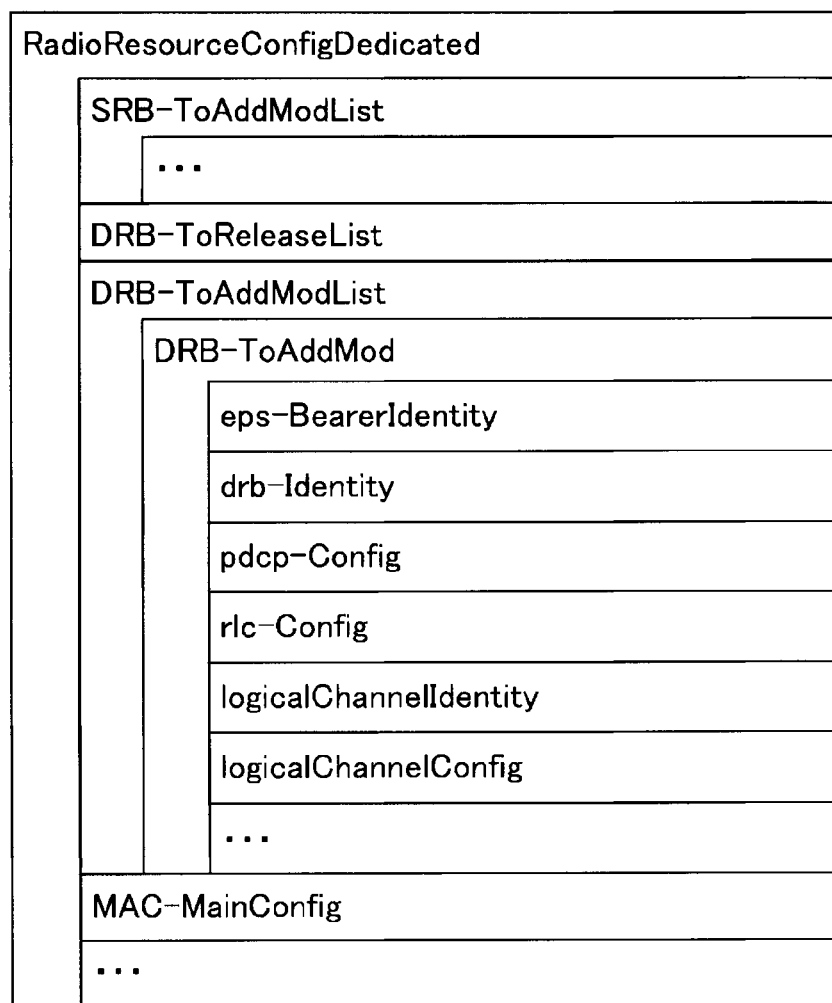
FIG. 9 is a diagram illustrating one example of an architecture of an information element relating to dedicated radio resource configuration, which is notified to a terminal device in the related art.

FIG. 9 is a diagram illustrating one example of an architecture of an information element (IE) relating to a dedicated radio resource configuration, which is notified to a terminal device 1 in the related art.

The base station apparatus 2 generates the information element (RadioResourceConfigDedicated) relating to the radio resource configuration that is dedicated to the terminal device 1 and notifies the terminal device 1 of the generated information element. With RadioResourceConfigDedicated, at least pieces of information indicating SRB-ToAddModList, DRB-ToReleaseList, DRB-ToAddModList, and MAC-MainConfig can be configured. The base station apparatus 2 is also able to be constituted in such a manner that some of these pieces of information are not included.

The terminal device 1 and the base station apparatus 2 start to perform the transmission and reception after the terminal device 1 and the base station apparatus 2 are configured according to performance such as QoS and a transfer path for data that is referred to as a radio bearer (RB) is established in the RRC layer. The radio bearer relating to the control-plane is referred to as a signalling radio bearer (SRB). Furthermore, the radio bearer relating to the user-plane is a data radio bearer (DRB).

In a case where addition (new configuration) or change of SRB is performed on the terminal device 1, SRB-ToAddModList is designated.

DRB-ToReleaseList is information that is configured in a case where deletion of (release) of DRB is performed on the terminal device 1. DRB that is to be deleted is designated by drb-Identity (DRB-Id) that will be described below. It is also possible to include multiple items of drb-Identity in DRB-ReleaseList.

DRB-ToAddModList is information that is configured in a case where addition (new configuration) or change of DRB is performed on the terminal device 1. DRB-ToAddModLIst is also able to include one item of, or multiple items of DRB-ToAddMod (DRB-ToAddMod #i where i=0, 1, and so forth up to n (n is an integer)).

In a case where control information (configuration) relating to DRB is added (newly configured) or changed for the terminal device 1, DRB-ToAddMod is configured, and is also able to include multiple pieces of control information (eps-BearerIdentity, drb-Identity, pdcp-Config, rlc-Config, logicalChannelIdentity, logicalChannelConfig, and the like). Moreover, the base station apparatus 2 is also able to include control information other than these pieces of control information in DRB-ToAddMod.

eps-BearerIdentity is information indicating an identifier of an EPS bearer that is the transfer path for data in a non-access stratum (NAS) layer. drb-Identity is information indicating an identifier (ID) that is used for identifying DRB which is used in the terminal device 1. Furthermore, in a case where change or deletion of the control information relating to DRB that is configured for the terminal device 1 is performed, drb-Identity is also used as an identification number in a case where DRB that is a target is designated.

pdcp-Config is information indicating a configuration of the PDCP layer relating to transmission and reception control of DRB that is configured for the terminal device 1. rlc-Config is information indicating a configuration of the RLC layer relating to the transmission and reception control of DRB that is configured for the terminal device 1.

logicalChannelIdentity is information indicating an ID that is used for identifying a logical channel (LCH) that corresponds to DRB which is configured for the terminal device 1. logicalChannelConfig is information indicating a configuration relating to the logical channel that corresponds to DRB which is configured for the terminal device 1.

Furthermore, MAC-MainConfig is information indicating a configuration relating to the MAC layer relating to corresponding SRB and/or DRB.

Figure 10:
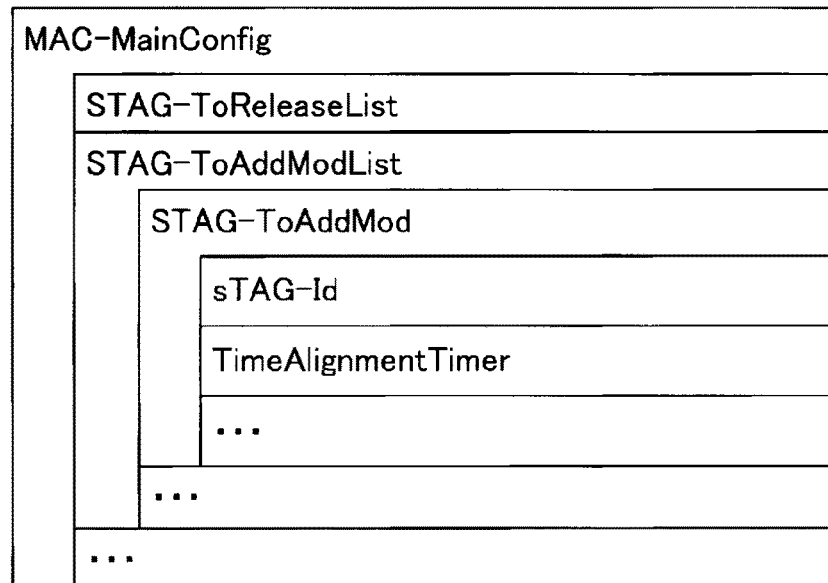
FIG. 10 is a diagram illustrating one example of an architecture of an information element relating to a configuration of a MAC layer, which is notified to the terminal device in the related art.

FIG. 10 is a diagram illustrating one example of an architecture of an information element relating to the MAC layer, which is notified to the terminal device 1 in the related art.

The base station apparatus 2 generates information (MAC-MainConfig) that includes the configuration relating to the MAC layer of the terminal device 1 and notified the terminal device 1 of the generated information. With MAC-MainConfig, at least pieces of information indicating STAG-ToReleaseList and STAG-ToAddModList can be configured. The base station apparatus 2 is also able to be constituted in such a manner that some of these pieces of information are not included.

STAG-ToReleaseList is information that is configured in a case where deletion (release) of a secondary transmission timing group (sTAG) that is configured for the terminal device 1 is performed. The sTAG that is to be deleted is designated by sTAG-Id that will be described below. It is also possible to include multiple items of sTAG-Id in STAG-ToReleaseList.

STAG-ToAddModList is information that is configured in a case where addition (new configuration) or change of the sTAG is performed on the terminal device 1. STAG-ToAddModLIst is also able to include one item of or multiple items of STAG-ToAddMod (STAG-ToAddMod #i where i=0, 1, and so forth up to n (n is an integer)).

In a case where control information relating to the sTAG is added (newly configured) or changed for the terminal device 1, STAG-ToAddMod is configured, and is also able to include multiple pieces of control information (sTAG-Id, TimeAlignmentTimer, and the like). Moreover, the base station apparatus 2 is also able to include control information other than these pieces of control information in STAG-ToAddMod.

sTAG-Id is information indicating an identifier of the sTAG that is configured for the terminal device 1. Furthermore, sTAG-Id is also used as an identification number in a case where the sTAG, which is a target in a case where change or deletion of the control information relating to the sTAG is performed, is designated. TimeAlignmentTimer is information indicating a configuration (a parameter value) of a transmission timing timer that is applied to the sTAG which is indicated with sTAG-Id (that is, that is used for adjustment and management of the uplink transmission timing of the secondary cell which belongs to the sTAG).

Figure 11:
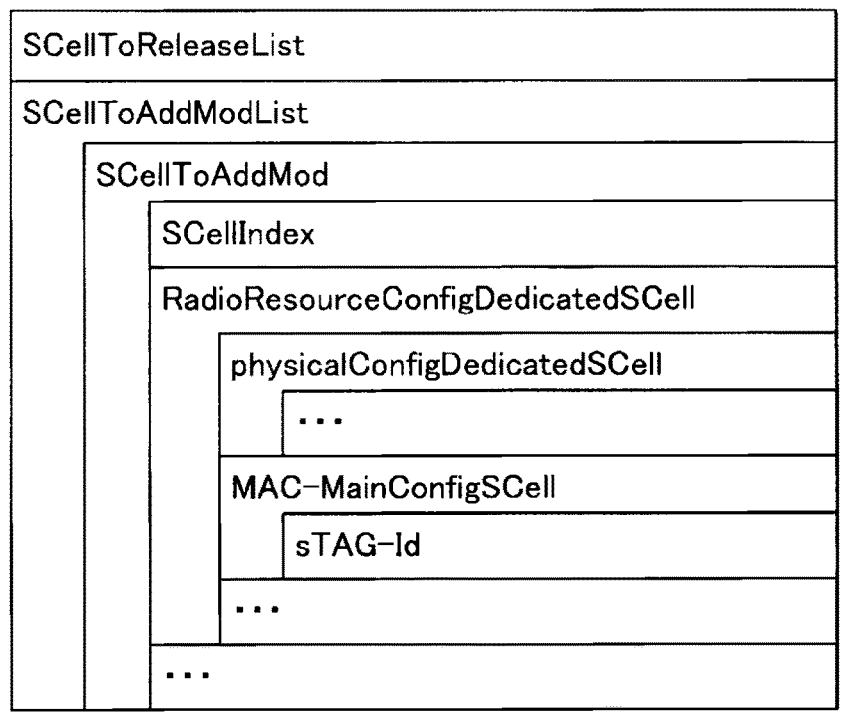
FIG. 11 is a diagram illustrating one example of an architecture of an information element relating to a configuration of a secondary cell, which is notified to the terminal device in the related art.

FIG. 11 is a diagram illustrating one example of an architecture of an information element relating to a configuration of the secondary cell, which is notified to the terminal device 1 in the related art.

The base station apparatus 2 generates information element (SCellToReleaseList or SCellToAddMod) that includes a configuration of the secondary cell for the terminal device 1, and notifies the terminal device 1 of the generated information element.

SCellToReleaseList is information that is configured in a case where deletion (release) of the secondary cell that is configured for the terminal device 1 is performed. The secondary cell that is to be deleted is designated by SCellIndex that will be described below. The base station apparatus 2 is also able to include multiple items of SCellIndex in SCellToReleaseList.

SCellToAddModList is information that is configured in a case where addition (new configuration) or change of the secondary cell is performed on the terminal device 1. The base station apparatus 2 is able to include one item of or multiple items of SCellToAddMod (SCellToAddMod #i where i=0, 1, and so forth up to n (n is an integer)) in SCellToAddModList.

SCellToAddMod is configured in a case where addition (new configuration) or change of control information (configuration) relating to the secondary cell is performed on the terminal device 1. The base station apparatus 2 is also able to include multiple pieces of control information (SCellIndex, RadioResourceConfigDedicatedSCell, and the like) in SCellToAddMod. Moreover, the base station apparatus 2 is also able to include control information other than these pieces of control information in SCellToAddMod.

SCellIndex is index information indicating the secondary cell that is added to the terminal device 1. Furthermore, SCellIndex is also used as an identification number in a case where, the secondary cell, which is a target in a case where change of the control information relating to the secondary cell or deletion of the secondary cell itself is performed, is designated.

With RadioResourceConfigDedicatedSCell, at least pieces of information indicating PhysicalConfigDedicatedSCell and MAC-MainConfigSCell can be configured. The base station apparatus 2 is also able to be constituted in such a manner that some of these pieces of information are not included.

PhysicalConfigDedicatedSCell is information indicating a configuration of a physical layer (PHY layer) of the secondary cell that is configured for the terminal device 1, and for example, includes control information relating to the physical channel.

MAC-MainConfigSCell is information indicating a configuration of a MAC layer that corresponds to the secondary cell. MAC-MainConfigSCell includes at least sTAG-Id.

In this manner, with this constitution, the base station apparatus 2 can realize the method of controlling the user-plane protocol using the identifier for the terminal device 1.

For example, by using drb-Identity as the identifier, the base station apparatus 2 is able to notify DRB that is an addition, change, or deletion target and configurations of the PDCP layer, the RLC layer, and the physical channel that correspond to DRB described above.

Furthermore, by using SCellIndex as the identifier, the base station apparatus 2 is able to notify the secondary cell that is an addition, change, or deletion target, a dedicated radio resource configuration of the physical layer (PHY layer) that corresponds to the secondary cell described above, and a configuration of the sTAG to which the secondary cell described above belongs.

Furthermore, by using sTAG-Id as the identifier, the base station apparatus 2 is able to notify the secondary transmission timing group that is an addition, change, or deletion target and a configuration of the transmission timing timer that corresponds to the secondary transmission timing group described above.

That is, the base station apparatus 2 causes multiple configurations (pieces of control information) relating to each of the layers to correspond (be linked) to the identifier, and, by using the identifier described above, performs the control (the addition, the update, or the deletion) of the user-plane protocol for the terminal device 1.

Suitable embodiments of the present invention will be described in detail below referring to the accompanying drawings, while considering the matters described above. Moreover, when the embodiment of the present invention is described, in a case where it is determined that a specific description of a known function or constitution associated with the embodiment of the present invention makes the gist of the embodiment of the present invention indefinite, a detailed description thereof is omitted.

First Embodiment

A first embodiment of the present invention will be described in detail below.

FIG. 1 is a block diagram illustrating one example of the terminal device 1 according to the first embodiment of the present invention. The present terminal device 1 is constituted at least from a receive antenna unit R01, a reception unit 101, a demodulation unit 102, a decoding unit 103, a reception data control unit 104, a physical layer control unit 105, a transmission data control unit 106, a coding unit 107, a modulation unit 108, a transmission unit 109, a transmit antenna unit T01, and a radio resource control unit 110. The "units" in the drawings are elements that are also expressed using the terms section, circuit, constituent device, device, unit, and the like and that realize a function of the terminal device 1 and each procedure.

The radio resource control unit 110 is a block that performs each function of the radio resource control (RRC) that executes state control, measurement control and report control of the terminal device 1, control of shared control information and dedicated control information, connection control, movement control, radio resource control, and the like. Furthermore, the reception data control unit 104 and the transmission data control unit 106 are blocks that perform each function in a medium access control (MAC) layer that manages a data link layer, a radio link control (RLC) layer, and a packet data convergence protocol (PDCP) layer.

Furthermore, the reception unit 101, the demodulation unit 102, the decoding unit 103, the coding unit 107, the modulation unit 108, the transmission unit 109, and the physical layer control unit 105 are blocks that perform each function in the physical layer (PHY layer).

Moreover, the terminal device 1 may be constituted from multiple blocks (the reception unit 101, the demodulation unit 102, and the decoding unit 103) in a reception system and multiples blocks (the coding unit 107, the modulation unit 108, and the transmission unit 109) in a transmission system, in order that, by using the carrier aggregation and/or the dual connectivity, multiple frequencies (frequency bands or frequency bandwidth) or the concurrent reception in cells can be supported in the reception system and multiple frequencies (frequency bands or frequency bandwidth) or the concurrent transmission in cells can be supported in the transmission system. Furthermore, the terminal device 1 may include multiple reception data control units 104, multiple physical layer control units 105, multiple transmission data control units 106, and multiple radio resource control units 110.

For example, the terminal device 1 may be constituted in such a manner that the reception data control unit 104 and the transmission data control unit 106 correspond to each of the multiple base station apparatuses 2 (which may be categorized into a secondary base station apparatus cell group and a connectivity group) that are connected using the dual connectivity. That is, a configuration may be employed in which all or some of the MAC layer, the RLC layer, and the PDCP layer operates (performs control) with respect to each of the base station apparatuses 2 that are connected.

It is desirable that at least, a function (for example, transmission timing adjustment, a random access procedure, a scheduling request, buffer status reporting, DRX, power headroom reporting, or the like) in the MAC layer can be configured for every base station apparatus (this function is referred to as multiple MAC (Dual MAC)). In the same manner, a constitution may be employed in such a manner that the physical layer control unit 105 or the radio resource control unit 110 operates (performs control) with respect to each of the base station apparatuses 2 that are connected.

With regard to reception processing by the terminal device 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal device 1.

The physical layer control information is configured by a wireless connection resource configuration that is transmitted in a dedicated manner from the base station apparatus 2 to the terminal device 1, cell-specific broadcast information, a system parameter, or the like, and, if need arises, is input by the radio resource control unit 110 into the physical layer control unit 105. The physical layer control unit 105 suitably input the reception control information, which is control information relating the reception, to the reception unit 101, the demodulation unit 102, and the decoding unit 103.

Included in the reception control information are pieces of information, as downlink scheduling information, such as reception frequency band information, reception timing relating to the physical channel and the physical signal, a multiplexing method, and radio resource arrangement information. Furthermore, the reception data control information is downlink control information that includes secondary cell deactivation timer information, discontinuous reception (DRX) control information, multicast data reception information, and downlink retransmission control information. Additionally, control information relating to the downlink in each of the MAC layer, the RLC layer, and the PDCP layer are included in the reception data control information.

The reception signal is received by the receive antenna unit R01, and is input into the reception unit 101. The reception unit 101 receives a signal from the base station apparatus 2 in accordance with the frequency and the frequency band that are designated in the reception control information. The reception unit 101 may include an RF circuit. The signal that is received is input into the demodulation unit 102. The demodulation unit 102 performs demodulation of the signal. The demodulation unit 102 inputs a post-demodulation signal into the decoding unit 103. The decoding unit 103 decodes the signal that is input, and inputs each piece of data (downlink data and downlink control data) that results from the decoding, into the reception data control unit 104. Furthermore, along with each piece of data, a MAC control element that is transmitted from the base station apparatus 2 is decoded in the decoding unit 103 as well, and the decoded MAC control element is input into the reception data control unit 104.

The reception data control unit 104 performs control of the physical layer control unit 105, which is based on the received MAC control element, buffering control of each piece of data that results from the decoding, error correction control (HARQ) of data that is retransmitted, and the like. Each piece of data that is input into the reception data control unit 104 is input into (transferred to) the radio resource control unit 110.

With regard to transmission processing by the terminal device 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, the transmission frequency band information, the transmission timing relating to the physical channel and the physical signal, the multiplexing method, and the radio resource arrangement information.

Furthermore, the transmission data control information is uplink control information that includes discontinuous transmission (DTX) control information, the random access configuration information, uplink shared channel information, logical channel priority information, resource request configuration information, cell group information, uplink retransmission control information, and the like. The radio resource control unit 110 may configure multiple pieces of random access configuration information that correspond to multiple cells, respectively, for the transmission data control unit 106. Furthermore, the radio resource control unit 110 manages the transmission timing adjustment information and the transmission timing timer that are used for adjustment of the uplink transmission timing, and manages an uplink transmission timing state (the transmission timing adjusted state or the transmission timing unadjusted state) for every cell (every cell group or every TA group). The transmission timing adjustment information and the transmission timing timer is included in the transmission data control information.

Moreover, there is a need to manage multiple uplink transmission timing states (Multi-TA), the transmission data control unit 106 manages the transmission timing adjustment information that corresponds to the uplink transmission timing in each of the multiple cells (the cell group or the TA group). Included in the resource element configuration information are at least maximum transmission counter configuration information and radio resource request prohibition timer information. The radio resource control unit 110 may configure multiple pieces of resource request configuration information that correspond to multiple cells, respectively, in the transmission data control unit 106.

Pieces of transmission data (the uplink data and the uplink control data) that are originated in the terminal device 1 are input from the radio resource control unit 110 into the transmission data control unit 106 at an arbitrary timing. At this time, the transmission data control unit 106 calculates an amount of transmission data (an amount of uplink buffer) that is input. Furthermore, the transmission data control unit 106 has a function of determining whether the transmission data that is input is data that belongs to the control-plane or is data that belongs to the user-plane.

Furthermore, when the transmission data is input into the transmission data control unit 106, the transmission data control unit 106 stores the transmission data in an internal or external uplink buffer of the transmission data control unit 106. Then, the transmission data control unit 106 determines that the radio resource indispensable for the transmission for the transmission data that is input, is allocated to the terminal device 1. The transmission data control unit 106 selects any one of the radio resource request (the scheduling request (SR)) that uses the physical uplink shared channel (PUSCH) and the physical uplink control channel (PUCCH) and the radio resource request that uses the physical random access channel, based on radio resource allocation, and makes a request to the physical layer control unit 105 for control processing for transmitting the selected channel.

That is, when the radio resource is already allocated and the transmission data is in a state of being able to be transmitted on the physical uplink shared channel (PUSCH), in accordance with the instruction of the radio resource control unit 110, the coding unit 107 acquires the transmission data corresponding to the already-allocated radio resource from the uplink buffer and coded the acquired transmission data, and inputs a result of the coding into the modulation unit 108. Furthermore, when the radio resource is not allocated, if the radio resource request by the physical uplink control channel is possible, in accordance with the instruction of the radio resource control unit 110, the coding unit 107 codes the control data indispensable for the transmission of the radio resource request on the physical uplink control channel and inputs a result of the coding into the modulation unit 108.

Furthermore, when the radio resource is not allocated, if the radio resource request by the physical uplink control channel is not possible, the coding unit 107 instructs the transmission data control unit 106 to start the random access procedure. At this time, based on the random access configuration information that is input from the transmission data control unit 106, the coding unit 107 generates the preamble sequence that is transmitted on the physical random access channel. Furthermore, in accordance with the transmission control information, the coding unit 107 suitably codes each piece of data and inputs a result of the coding into the modulation unit 108.

Based on a channel architecture in which each piece of coded data is transmitted, the modulation unit 108 performs suitable modulation processing. Along with mapping each piece of data being modification-processed to the frequency domain, the transmission unit 109 converts a signal in the frequency domain into a signal in the time domain, impresses the resulting signal on a carrier wave in the existing frequency, and performs power amplification. In accordance with the transmission timing adjustment information for every cell (every cell group or every TA group) that is input from the radio resource control unit 110, The transmission unit 109 further adjusts the uplink transmission timing. The transmission unit 109 may include the RF circuit. A transmission signal that is output from the transmission unit 109 is transmitted from the transmit antenna unit T01. The physical uplink shared channel in which the uplink control data is arranged is also able to include, for example, the layer 3 message (the radio resource control message and the RRC message) in addition to the user data.

Other constituent elements of the terminal device 1 and a transfer path (channel) for data (the control information) between the constituent elements are omitted in FIG. 1, but it is apparent that multiple blocks that have other functions indispensable for the terminal device 1 to operate are retained as constituent elements. For example, a NAS layer unit that executes control with a core network, or an application layer unit is present above the radio resource control unit 110.

Furthermore, the receive antenna unit RO 1 or the transmit antenna unit T01 is typically a planar multi-band antenna, but can be constituted by employing an arbitrary antenna suitable for the terminal device capability, the shape, the purpose and the like of the terminal device 1. For example, the receive antenna unit R01 or the transmit antenna unit T01 may be constituted from multiple antenna units or may have directivity. Furthermore, the receive antenna unit R01 and the transmit antenna unit T01 may be integrated into one piece.

Furthermore, as described above, in a case where the terminal device 1 includes the multiple reception data control units 104, the multiple physical layer control units 105, the multiple transmission data control units 106, and the multiple radio resource control units 110, each of the control information, the downlink control data, the downlink data, the uplink control data, and the uplink data is one relating to the base station apparatus 2 to which each block corresponds. For example, a signal that is received from the base station apparatus 2-1 is input into the reception data control unit 104 that corresponds to the base station apparatus 2-1, but the signal that is received from the base station apparatus 2-1 is not input into the reception data control unit 104 that corresponds to the base station apparatus 2-2.

Figure 2:
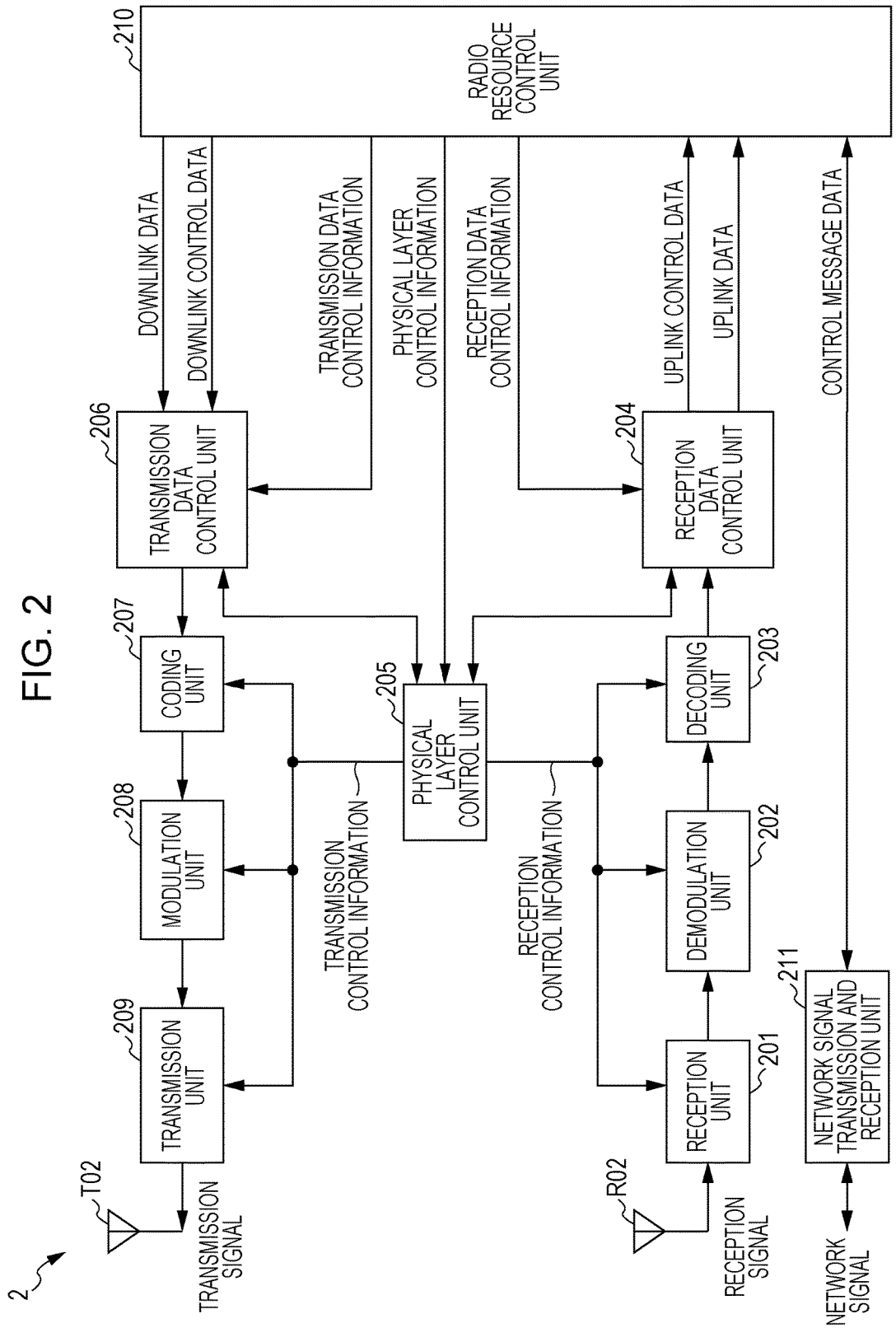
FIG. 2 is a block diagram illustrating a schematic constitution of a base station apparatus according to the embodiment of the present invention.

FIG. 2 is a block diagram illustrating one example of the base station apparatus 2 according to the first embodiment of the present invention. The present base station apparatus is constituted at least from a receive antenna unit R02, a reception unit 201, a demodulation unit 202, a decoding unit 203, a reception data control unit 204, a physical layer control unit 205, a transmission data control unit 206, a coding unit 207, a modulation unit 208, a transmission unit 209, a transmit antenna unit T02, a radio resource control unit 210, a network signal transmission and reception unit 211. The "units" in the drawings are elements that are also expressed using the terms section, circuit, constituent device, device, unit, and the like and that perform a function of the base station apparatus 2 and execute each procedure.

The radio resource control unit 210 is a block that performs each function of the radio resource control (RRC) layer that executes the radio resource control of the base station apparatus 2. Furthermore, the reception data control unit 204 and the transmission data control unit 206 are blocks that perform each function in the medium access control (MAC) layer that manages the data link layer, the radio link control (RLC) layer, and the packet data convergence protocol (PDCP) layer.

Furthermore, the reception unit 201, the demodulation unit 202, the decoding unit 203, the coding unit 207, the modulation unit 208, the transmission unit 209, and the physical layer control unit 205 are blocks that perform each function in the physical layer (PHY layer).

Moreover, the base station apparatus 2 may be constituted from multiple blocks (the reception unit 201, the demodulation unit 202, and the decoding unit 203) in the reception system and multiples blocks (the coding unit 207, the modulation unit 208, and the transmission unit 209) in the transmission system, in order that, by using the carrier aggregation and/or the dual connectivity, multiple frequencies (frequency bands or frequency bandwidth) are supported. Furthermore, the base station apparatus 2 may include multiple reception data control units 204, multiple physical layer control units 205, multiple transmission data control units 206, multiple radio resource control unit 210, and multiple network signal transmission and reception unit 211.

The radio resource control unit 210 inputs the downlink data and the downlink control data into the transmission data control unit 206. In a case where the MAC control element that is to be transmitted to the terminal device 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the signal that is modulated in the modulation unit 208 is input into the transmission unit 209. After the signal that is input is mapped to the frequency domain, the transmission unit 209 converts a signal in the frequency domain into a signal in the time domain, impresses the resulting signal on a carrier wave in the existing frequency, and performs the power amplification. The transmission unit 209 may include the RF circuit. A transmission signal that is output from the transmission unit 209 is transmitted from the transmit antenna unit T02. The physical downlink shared channel in which the downlink control data is arranged typically constitutes the layer 3 message (the RRC message).

Furthermore, the reception signal is received by the receive antenna unit R02, and is input into the reception unit 201. The reception unit 201 converts the signal that is received from the terminal device 1 into a digital signal in a baseband. In a case where a cell at multiple different transmission timings are configured for the terminal device 1, the reception unit 201 receives the signal at different timings for every cell (every cell group or every TA group). The digital signal that results from the conversion in the reception unit 201 is input into the demodulation unit 202 and is demodulated.

The signal that results from the demodulation in the demodulation unit 202 is subsequently input into the decoding unit 203. The decoding unit 203 decodes the signal that is input, and inputs each piece of data (uplink data and uplink control data) that results from the decoding, into the reception data control unit 204. Furthermore, along with each piece of data, the MAC control element that is transmitted from the terminal device 1 is decoded in the decoding unit 203 as well, and the decoded MAC control element is input into the reception data control unit 204.

The reception data control unit 204 performs control of the physical layer control unit 205, which is based on the received MAC control element, performs buffering of each piece of data that results from the decoding, and performs the error correction control (HARM) of data that is retransmitted. Each piece of data that is input into the reception data control unit 204 is input into (transferred to) the radio resource control unit 210.

The physical layer control information that is indispensable for these types of control of each block is information that is constituted from reception control information and transmission control information and that includes a parameter configuration indispensable for wireless communication control by the base station apparatus 2. The physical layer control information is configured by a higher-level network apparatus (an MME, a serving gateway (SGW), an OAM) or a system parameter, and, if need arises, is input by the radio resource control unit 210 into the control unit 204.

The physical layer control unit 205 inputs the physical layer control information associated with the transmission, as the transmission control information, into each block, that is, the coding unit 207, the modulation unit 208, and the transmission unit 209, and suitably inputs the physical layer control information associated with the reception, as the reception control information, into each block, that is, the reception unit 201, the demodulation unit 202, and the decoding unit 203.

Included in the reception data control information is the control information relating to the uplink, of the terminal device 1 for each of the MAC layer, the RLC layer, and the PDCP layer of the base station apparatus 2. Furthermore, included in the transmission data control information is the control information relating to the downlink, of the terminal device 1 for each of the MAC layer, the RLC layer, and the PDCP layer of the base station apparatus 2. That is, the reception data control information and transmission data control information are configured for every terminal device 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path (channel) for data (the control information) between the constituent elements are omitted in FIG. 2, but it is apparent that multiple blocks that have other functions indispensable for the base station apparatus 2 to operate are retained as constituent elements. For example, a radio resource management (RRM) unit or an application layer unit is present over the radio resource control unit 210.

Furthermore, the receive antenna unit R02 or the transmit antenna unit T02 is typically a planar multi-band antenna, but can be constituted by employing an arbitrary antenna suitable for the transmission capability, the shape, the purpose and the like of the base station apparatus 2. For example, the receive antenna unit R02 or the transmit antenna unit T02 may be constituted from multiple antenna units or may have directivity. Furthermore, the receive antenna unit R02 and the transmit antenna unit T02 may be integrated into one piece. Additionally, the receive antenna unit R02 and the transmit antenna unit T02 (as well as the reception unit 201 and the transmission unit 209) may be constituted as one unit (a remote radio head (RRH)) that is independent from the base station apparatus 2, and may be arranged at a different position than the base station apparatus 2.

Furthermore, as a network constitution of a communication system in which the present terminal device 1 and the present base station apparatus 2 are arranged, the same constitution as illustrated in FIG. 6 can be applied.

Figure 3:
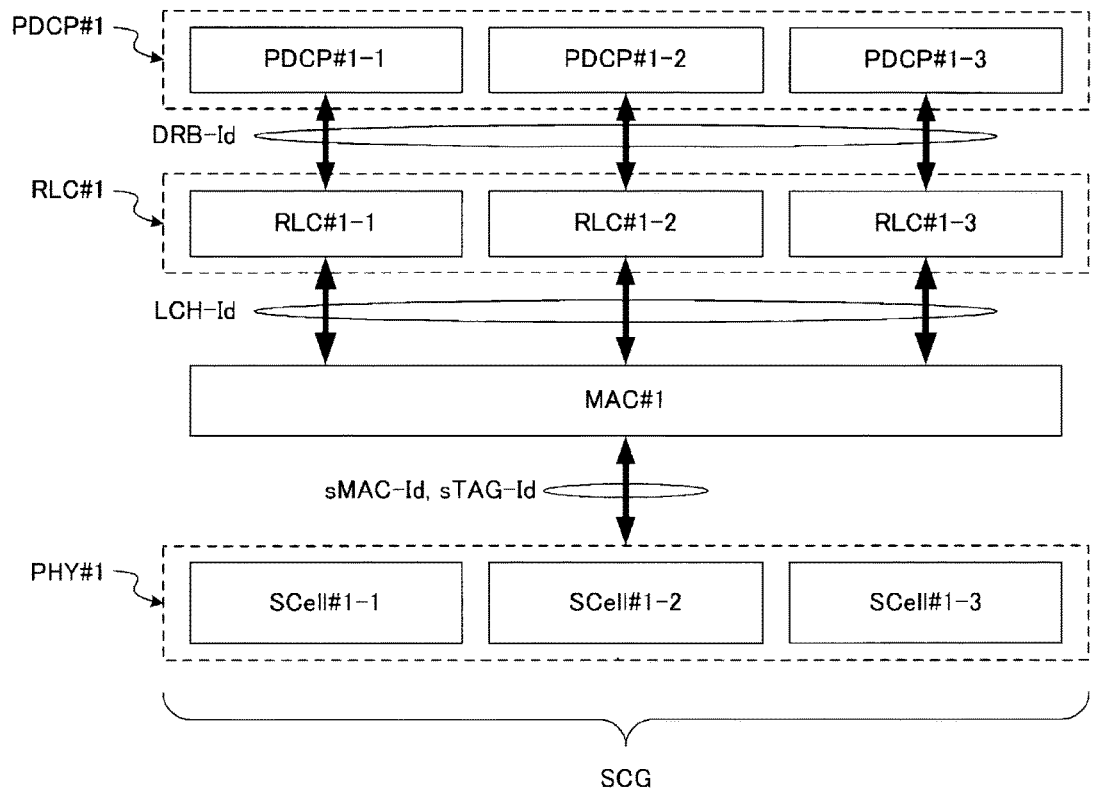
FIG. 3 is a block diagram illustrating one example of correspondence relationships in radio configuration among layers according to a first embodiment of the present invention.

FIG. 3 illustrates one example of a protocol architecture of the user-plane of the SCG in the terminal device 1 and a correspondence relationship in radio configuration among layers that constitute the SCG The user-plane protocol architecture in FIG. 3 corresponds to that in FIG. 7. That is, for the terminal device 1, PDCP #0 for performing processing of data corresponding to a cell that belongs to the MCG and PDCP #1 on the SCG side for performing processing of data corresponding to a cell that belongs to the SCG are configured as the PDCP layers.

Furthermore, for the terminal device 1, RLC #0 for performing the processing of the data corresponding to the cell that belongs to the MCG and RLC #1 on the SCG side for performing the processing of the data corresponding to the cell that belongs to the SCG are configured as the RLC layers. Furthermore, for the terminal device 1, MAC #0 for performing the processing of the data corresponding to the cell that belongs to the MCG and MAC #1 on the SCG side for performing the processing of the data corresponding to the cell that belongs to the SCG are configured as the MAC layers. Furthermore, for the terminal device 1, PHY #0 for performing the processing of the data corresponding to the cell that belongs to the MCG and PHY #1 on the SCG side for performing the processing of the data corresponding to the cell that belongs to the SCG are configured as the PHY layers. However, because a constitution of each layer and a method of controlling each layer on the MCG side may be the same as that in the related art, detailed descriptions thereof are omitted.

FIG. 3 illustrates an example in which three cells (secondary cells) as cells that constitute the SCG are configured. At this point, the secondary cells are referred to as secondary cell 1-1 (SCell #1-1), secondary cell 1-2 (SCell #1-2), and secondary cell 1-3 (SCell #1-3), respectively.

At this time, each secondary cell performs transfer of the downlink data that is received in each secondary cell, with respect to MAC#1. Furthermore, each secondary cell performs the transfer of the uplink data from MAC #1 according to uplink radio resource allocation. Furthermore, the terminal device 1 determines control relating to the cell that belongs to the SCG, using an identifier (sMAC-Id) relating to the multiple MAC that is configured by the base station apparatus 2. Additionally, in a case where there are multiple TAGs, to each of which the secondary cell belongs, the control relating to the cell that belongs to the SCG is determined, further using an identifier (sTAG-Id) relating to the secondary transmission timing group that is configured by the base station apparatus 2.

That is, sMAC-Id is a first identifier relating to the MAC layer, which identifies (distinguishes or determines) a first MAC layer which corresponds to the base station apparatus 2-1 in the macro cell and a second MAC layer which corresponds to the base station apparatus 2-2 in the small cell. Furthermore, sTAG-Id is a second identifier relating to the MAC layer, one or multiple of which are configured for every base station apparatus 2 in a case where in the base station apparatus 2-1 in the macro cell or the base station apparatus 2-2 in the small cell, there is a need for multiple uplink transmission timings for the transmission in the uplink, and which indicates the group in accordance with the uplink transmission timing of the cell.

Moreover, the control relating to the cell that belongs to the SCG is, for example, for the transmission timing adjustment, the random access procedure, the scheduling request, the buffer status reporting, the DRX, the power headroom reporting, or the like.

Furthermore, with regard to the DRB that is configured in accordance with QoS and the like of the user data, the terminal device 1 is notified by the base station apparatus 2 of at least an identifier (drb-Identity (DRB-Id)) that corresponds to the DRB and an identifier (logicalChannelIdentity (LCH-Id)) of the logical channel that corresponds to the DRB.

Furthermore, the base station apparatus 2 can notify each of the configurations relating to the PDCP layer and the RLC layer that correspond to the DRB which is configured for the terminal device 1.

For example, in a case where DRB #1 to DRB #3 are configured for the terminal device 1 in order to receive a data service that is provided through the cell in the SCG, the base station apparatus 2 can configure PDCP #1-1, RLC #1-1, DRB-Id #1 and LCH-Id #1 that correspond to DRB #1, can configure PDCP #1-2, RLC #1-2, DRB-Id #2 and LCH-Id #2 that correspond to DRB #2, and can configure PDCP #1-3, RLC #1-3, DRB-Id #3 and LCH-Id #3 that correspond to DRB #3.

In this manner, by using multiple identifiers, such as sMAC-Id, sTAG-Id, DRB-Id, and LCH-Id, the terminal device 1 and the base station apparatus 2 are able to establish a transfer path (channel) for the user data in the PDCP layer, the RLC layer, the MAC layer, and the PHY layer that correspond to the SCG in the dual connectivity.

Figure 4:
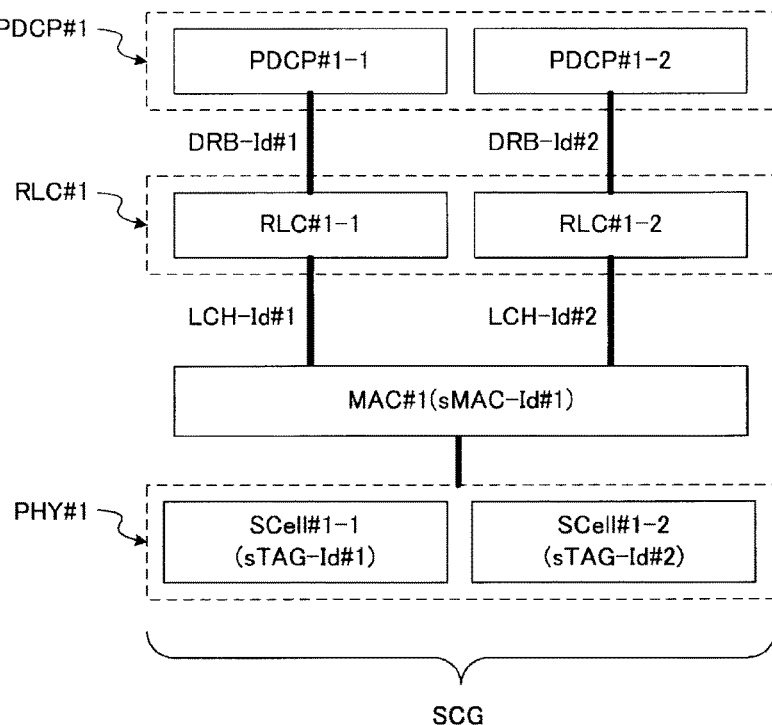
FIG. 4 is a diagram illustrating one example of a transfer path for user data of a terminal device according to the first embodiment of the present invention.

The transfer path for the user data in the terminal device 1 is described referring to FIG. 4. PDCP #1-1, RLC #1-1, and LCH-Id #1 are configured for DRB #1 (DRB-Id #1). Furthermore, PDCP #1-2, RLC #1-2, and LCH-Id #2 are configured for DRB #2 (DRB-Id #2). Furthermore, it is assumed that as TAGs, sTAG-Id #1 indicating TAG #1 to which SCell #1-1 belongs, and sTAG-Id #2 indicating TAG #2 to which SCell #1-2 belongs are configured.

Furthermore, with sMAC-Id #1, a configuration is established in which the MAC layer corresponding to PHY #1 (SCell #1-1 and SCell #1-2) is MAC #1. Furthermore, with sMAC-ID #1, a configuration is established in which the MAC layer corresponding to RLC #1 (RLC #1-1 and RLC #1-2, or LCH-Id #1 and LCH-Id #2) is MAC #1.

At this point, in a case where in PDCP #1-1, the uplink data (a PDCP service data unit (SDU)) of DRB #1 is originated (provided), a data unit (a PDCP protocol data unit (PDU)) to which a PDCP header is attached for data is generated in PDCP #1-1, and PDCP PDU is transferred to RLC (RLC #1-1) that is indicated with corresponding DRB-Id (DRB-Id #1).

In RLC #1-1, one or multiple PDCP PDUs are divided or combined and thus an RLC SDU is generated. Furthermore, an RLC header including corresponding LCH-Id (LCH-Id #1) is attached and thus the data unit (RLC PDU) for RLC is generated. Furthermore, in RLC #1-1, the RLC PDU is transferred to MAC (MAC #1) that is indicated with corresponding sMAC-Id (sMAC-Id #1).

In MAC #1, a cell transmitting a MAC PDU is determined based on a state of the TAG and a state (activation/inactivation) of the cell, which are managed in the SCG, uplink radio resource allocation information that is notified from PHY #1, and the like. For example, in a case where the uplink radio resource allocation is absent in SCell #1-1 and on the other hand, the uplink radio resource allocation is present in SCell #1-2, in MAC #1, the MAC PDU for SCell #1-2 is generated and is transferred to PHY #1.

Furthermore, in a case where the transmission timing timer of TAG #2 comes to a standstill, or in a case where SCell #1-2 is in a deactivated state, in MAC #1, the MAC PDU for SCell #1-1 is generated based on the uplink radio resource allocation in SCell #1-1, and the generated MAC PDU is transferred to PHY #1. In MAC #1, data is acquired based on a priority level of the logical channel from one or multiple RLC PDUs, and the MAC SDU is generated by performing multiplexing and assembly, and the MAC PDU is generated by attaching a MAC header, and if need arises, the MAC control element to the MAC SDU.

On the other hand, in a case where downlink data allocation is present in PHY #1 (SCell #1-1 or SCell #1-2), the reception processing is performed in MAC (MAC #1) that is indicated with corresponding sMAC-Id (sMAC-Id #1). In MAC #1, in a case where the MAC PDU is correctly constructed, disassembly and demultiplex are performed, one or multiple MAC control elements and one or multiple MAC SDUs (that is, RLC PDUs) are generated (demultiplexed) from the MAC PDU based on the MAC header, and the RLC PDU is transferred to the corresponding RLC layer based on LCH-Id that is included in the MAC header.

For example, in a case where LCH-Id that is included in the received downlink data is LCH-Id #1, the RLC PDU is transferred to RLC #1-1. In RLC #1-1, the RLC PDU relating to LCH-Id #1 is divided or combined, and thus reordering in the order that the data units are aligned is performed. Furthermore, the PDCP PDU is constructed for PDCP #1-1 that is associated with RLC #1-1 using DRB-Id #1 and is transferred.

Figure 5:
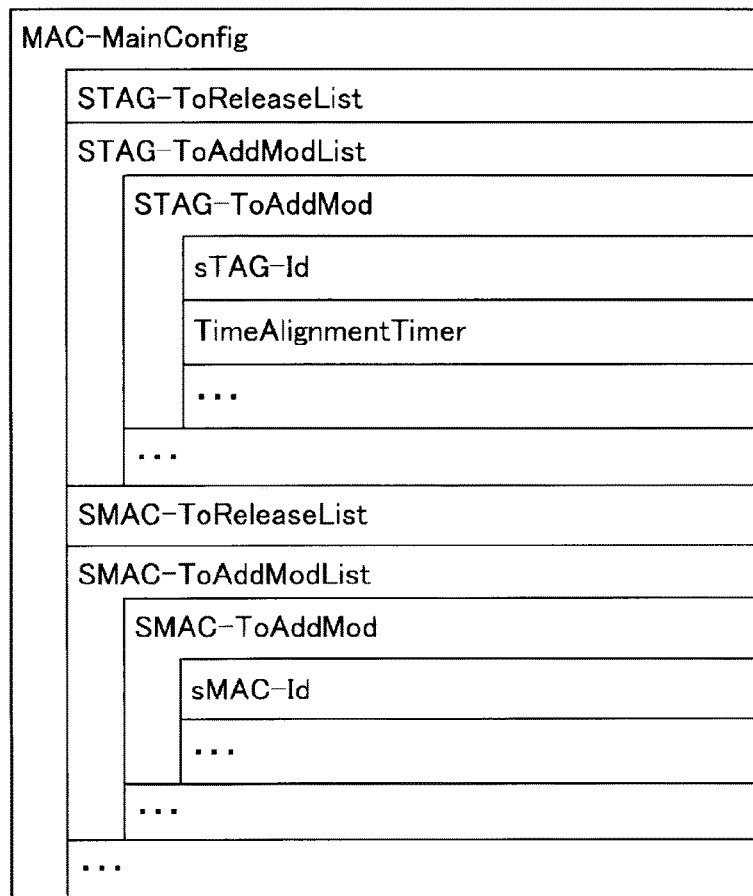
FIG. 5 is a diagram illustrating one example of an architecture of an information element that is used for a configuration of a user-plance protocol according to the first embodiment of the present invention.

FIG. 5 illustrates one example of an architecture of the information element in which to configure the MAC layer (which is hereinafter referred to as secondary MAC (sMAC)) for performing processing corresponding to the cell of the base station apparatus 2-2 in the dual connectivity on a configuration (FIG. 10) of the MAC layer that is configured for the terminal device 1 in the related art, and particularly of an architecture that is suitable for adding an identifier (a secondary MAC identifier (sMAC-Id)) for the secondary MAC.

In FIG. 5, at least SMAC-ToReleaseList and SMAC-ToAddModList are added to MAC-MainConfig. SMAC-ToReleaseList is information that is configured in a case where deletion (release) of the secondary MAC that is configured for the terminal device 1 is performed. The secondary MAC that is to be deleted is designated by sMAC-Id. It is also possible to include multiple items of sMAC-Id in SMAC-ToReleaseList in the future.

SMAC-ToAddModList is information that is configured in a case where addition (new configuration) or change of the secondary MAC is performed on the terminal device 1. SMAC-ToAddModList is also able to include one item of, or multiple items of SMAC-ToAddMod (sMAC-ToAddMod #i where i=0, 1, and so forth up to n (n is an integer)).

In a case where control information relating to the secondary MAC is added (newly configured) or changed for the terminal device 1, SMAC-ToAddMod is configured, and is also able to include multiple pieces of control information (sMAC-Id and the like). Moreover, the base station apparatus 2 is also able to include control information other than these pieces of control information in SMAC-ToAddMod.

sMAC-Id is information indicating an identifier of the secondary MAC that is configured for the terminal device 1. Furthermore, sMAC-Id is also used as an identification number in a case where the secondary MAC, which is a target in a case where change or deletion of the control information relating to the secondary MAC is performed, is designated.

sMAC-Id is also used for indicating a correspondence relationship (a link) with the sTAG that belongs to the secondary MAC in transfer of uplink user data. For example, by adding sMAC-Id to RadioResourceConfigDedicatedSCell or MAC-MainConfigSCell in SCellToAddMod, the base station apparatus 2 can indicate the correspondence relationship between the secondary MAC and the sTAG of the secondary cell.

Furthermore, sMAC-Id is also used for indicating a correspondence relationship (a link) between the secondary MAC and the RLC layer in transfer of downlink user data. For example, by adding sMAC-Id to rlc-Config in DRB-ToAddMod or DRB-ToAddMod, the base station apparatus 2 can indicate the correspondence relationship between the secondary MAC and the RLC layer.

In this manner, by configuring the secondary MAC identifier as a new identifier for identifying the secondary MAC, as an information element indicating correspondence relationships among the layers, the base station apparatus 2 and the terminal device 1 can uniquely establish the transfer path for the user data in the dual connectivity (which, for example, is illustrated in FIG. 4) based on the correspondence relationship.

Furthermore, the terminal device 1 and the base station apparatus 2 are able to perform efficient communication control that uses identifiers, such as sMAC-Id, sTAG-Id, DRB-Id, and SCellIndex, in a configuration for each of the PDCP layer, the RLC layer, the MAC layer, and the PHY layer that relate to processing for the transmission and reception of the user data in the SCG in the dual connectivity.

For example, in a case where the secondary MAC in the SCG is released, by transmitting SMAC-ToReleaseList in which sMAC-Id that corresponds to the secondary MAC which is a release target is configured, the base station apparatus 2 can release a configuration relating to the secondary MAC from the terminal device 1.

Furthermore, for example, in a case where the secondary MAC in the SCG is released, by configuring sMAC-Id, sTAG-Id, and SCellIndex that correspond to the secondary MAC, the sTAG of the secondary cell that belongs to the secondary MAC, and the secondary cell that belongs to the sTAG, respectively, as release targets, for transmission, the base station apparatus 2 can release a related configuration from the terminal device 1.

Furthermore, for example, in the case where the secondary MAC in the SCG is released, by configuring sMAC-Id, sTAG-Id, SCellIndex, and DRB-Id (drb-Identity) that correspond to the secondary MAC, the sTAG of the secondary cell that belongs to the secondary MAC, the secondary cell that belongs to the sTAG, and a configuration relating to the DRB that corresponds to the secondary MAC, respectively, as release targets, for transmission, the base station apparatus 2 can release a related configuration from the terminal device 1.

Moreover, the configuration relating to the DRB indicates multiple pieces of control information (eps-BearerIdentity, drb-Identity, pdcp-Config, rlc-Config, logicalChannelIdentity, logicalChannelConfig, and the like) that are configured when the DRB is added.

Furthermore, for example, in a case where the sTAG in the SCG is released, by transmitting STAG-ToReleaseList in which sTAG-Id that corresponds to the sTAG which is a release target is configured, the base station apparatus 2 can release a configuration relating to the sTAG from the terminal device 1.

Furthermore, for example, in the case where the sTAG in the SCG is released, if the sTAGs of the terminal device 1 in the SCG are all released by transmitting STAG-ToReleaseList in which sTAG-Id that corresponds to the sTAG which is a release target is configured, the base station apparatus 2 can release a related configuration from the terminal device 1 by configuring sMAC-Id and SCellIndex that correspond to the secondary MAC and the secondary cell that corresponds to the sTAG, respectively, as release targets, for transmission.

Furthermore, for example, in a case where the DRB in the SCG is released, by transmitting DRB-ToReleaseList in which DRB-Id that belongs to the DRB which is a release target is configured, the base station apparatus 2 can release a configuration relating to the DRB from the terminal device 1.

Furthermore, for example, in the case where the DRB in the SCG is released, if the DRBs of the terminal device 1 in the SCG are all released by transmitting DRB-ToReleaseList in which DRB-Id that corresponds to the DRB which is a release target is configured, the base station apparatus 2 can release the related configuration from the terminal device 1 by configuring sMAC-Id, sTAG-Id, and SCellIndex that correspond to the secondary MAC, the sTAG of the secondary cell that belongs to the secondary MAC, and the secondary cell that belongs to the sTAG, respectively, as release targets, for transmission.

Furthermore, for example, in a case where the secondary cell in the SCG is released, by transmitting SCellToReleaseList in which SCellIndex that corresponds to the secondary cell which is a release target is configured, the base station apparatus 2 can release a configuration relating to the secondary cell from the terminal device 1.

Furthermore, for example, in a case where the secondary cell in the SCG is released, if the secondary cells that belong to the sTAG of the terminal device 1 in the SCG are all released by transmitting SCellToReleaseList in which SCellIndex that corresponds to the secondary cell which is a release target is configured, the base station apparatus 2 can release a related configuration from the terminal device 1 by configuring sTAG-Id and SCellIndex that correspond to the sTAG of the secondary cell that belongs to the secondary MAC and the secondary cell that belongs to the sTAG, respectively, as release targets, for transmission.

Furthermore, for example, in the case where the secondary cell in the SCG is released, if the secondary cells that belong to the secondary MAC of the terminal device 1 in the SCG are all released by transmitting SCellToReleaseList in which SCellIndex that corresponds to the secondary cell which is a release target is configured, the base station apparatus 2 can release a related configuration from the terminal device 1 by configuring sMAC-Id, sTAG-Id, and SCellIndex that correspond to the secondary MAC, the sTAG of the secondary cell that belongs to the secondary MAC, and the secondary cell that belongs to the sTAG, respectively, as release targets, for transmission.

Furthermore, for example, in the case where the secondary cell in the SCG is released, if the secondary cells that belong to the secondary MAC of the terminal device 1 in the SCG are all released by transmitting SCellToReleaseList in which SCellIndex that corresponds to the secondary cell which is a release target is configured, the base station apparatus 2 can release a related configuration from the terminal device 1 by configuring sMAC-Id, sTAG-Id, SCellIndex, and DRB-Id (drb-Identity) that correspond to the secondary MAC, the sTAG of the secondary cell that belongs to the secondary MAC, the secondary cell that belongs to the sTAG, and the configuration relating to the DRB that corresponds to the secondary MAC, respectively, as release targets, for transmission.

Moreover, according to the present embodiment, the method in which the transfer path for the user data is established using a new identifier (sMAC-Id) is described, but it is also possible to use an existing identifier, not the new identifier. For example, a correspondence relationship between the RLC layer and the MAC layer in the SCG may be configured by including DRB-Id as an identifier in a configuration of the secondary MAC. Furthermore, for example, the correspondence relationship between the RLC layer and the MAC layer in the SCG may be configured by including LCH-Id as an identifier in the configuration of the secondary MAC.

Furthermore, for example, the correspondence relationship between the RLC layer and the MAC layer in the SCG may be configured by including sTAG-Id as an identifier in the configuration of the PDCP layer or the configuration of the RLC layer. Furthermore, for example, the correspondence relationship between the RLC layer and the MAC layer in the SCG may be configured by including a new identifier (sMAC-Id) as an identifier in the configuration of the PDCP layer or the configuration of the RLC layer.

The terminal device 1 according to the present embodiment can receive a configuration of an identifier that corresponds to the MAC layer (the secondary MAC) in a secondary cell group, from the base station apparatus 2, and can efficiently perform addition, change, and deletion of the secondary MAC by performing configuration of the secondary MAC using the identifier. Furthermore, in order to associate the secondary MAC, a lower layer (the PHY layer), and a higher layer (the PDCP layer or the RLC layer) with one another, the terminal device 1 can establish the transfer path for the user data by using the identifier.

In this manner, because the terminal device 1 is able to perform addition, change, and deletion of multiple pieces of control information on each of the layers by using multiple identifiers relating to the dual connectivity, the control can be streamlined and the communication control can be efficiently performed.

Furthermore, the base station apparatus 2 according to the present embodiment can configure the identifier that corresponds to the MAC layer (the secondary MAC) in the secondary cell group, for the terminal device 1 and transmit the configured identifier, and, by performing the configuration of the secondary MAC using the identifier, can efficiently perform the addition, the change, and the deletion of the secondary MAC. Furthermore, the base station apparatus 2 can establish the transfer path for the user data by using the identifier in order to associate the secondary MAC, the lower layer (the PHY layer), and the higher layer (the PDCP layer or the RLC layer) with one another for the terminal device 1.

In this manner, because the base station apparatus 2 is able to perform addition, change, and deletion of multiple pieces of control information on each of the layers by using multiple identifiers relating to the dual connectivity, the control can be streamlined and the communication control can be efficiently performed.

Second Embodiment

A second embodiment of the present invention will be described below.

According to the first embodiment, the method is described in which the base station apparatus 2 controls the control information (the configuration) of each layer using the identifier, and the method is described in which, in a case where the release of the control information in a certain layer has an influence on the transfer path for the user data, that is, in a case where the transfer path is difficult to establish, or in a case where the transfer path is difficult to determine uniquely, the control information of the corresponding layer is released in the base station apparatus 2.

On the other hand, if it can be detected (determined) in the terminal device 1 that the release of the control information in a certain layer has an influence on the transfer path for the user data, because an amount of control information that is transmitted from the base station apparatus 2 is further reduced, more efficient communication control is possible.

Accordingly, according to the second embodiment, a method is described in which the control information of the corresponding layer is determined in the terminal device 2 and is autonomously (automatically) released. The terminal device 1 and the base station apparatus 2 according to the second embodiment may have the same constitutions as illustrated in FIGS. 1 and 2, respectively.

In a case where SMAC-ToReleaseList in which sMAC-Id corresponding to the secondary MAC that is a release target is configured is received from the base station apparatus 2, the terminal device 1 autonomously releases each of the configuration of the sTAG of the secondary cell that belongs to the secondary MAC, and the secondary cell that belongs to the sTAG.

Furthermore, for example, in the case where SMAC-ToReleaseList in which sMAC-Id corresponding to the secondary MAC that is a release target is configured is received from the base station apparatus 2, the terminal device 1 autonomously releases each of the configuration of the sTAG of the secondary cell that belongs to the secondary MAC, the configuration of the secondary cell that belongs to the sTAG, and the configuration of the DRB that corresponds to the secondary MAC.

Furthermore, for example, in the case where SMAC-ToReleaseList in which sMAC-Id corresponding to the secondary MAC that is a release target is configured is received from the base station apparatus 2, the terminal device 1 autonomously releases each of the configuration of the sTAG of the secondary cell that belongs to the secondary MAC, the configuration of the secondary cell that belongs to the sTAG, and the configuration of the DRB that corresponds to the secondary MAC.

Furthermore, for example, in a case where STAG-ToReleaseList in which sTAG-Id corresponding to the sTAG that is a release target is configured is received from the base station apparatus 2, the terminal device 1 releases the configuration relating to the sTAG.

Furthermore, for example, in a case where STAG-ToReleaseList in which sTAG-Id corresponding to the sTAG that is a release target is configured is received from the base station apparatus 2 and all the sTAGs of the terminal device 1 in the SCG are released, the terminal device 1' autonomously releases each of the configuration relating to the secondary MAC that corresponds to the sTAG-Id, the configuration of the secondary cell that belongs to the sTAG, and multiple pieces of control information relating to the sTAG.

Furthermore, for example, in a case where DRB-ToReleaseList in which DRB-Id corresponding to the DRB that is a release target is configured is received from the base station apparatus 2, the terminal device 1 releases the configuration relating to the DRB.

Furthermore, for example, in a case where DRB-ToReleaseList in which DRB-Id corresponding to the DRB that is a release target is configured is received from the base station apparatus 2 and all the DRBs of the terminal device 1 in the SCG are released, the terminal device 1' autonomously releases each of the configuration relating to the secondary MAC that corresponds to the DRB-Id, the configuration of the sTAG of the secondary cell that belongs to the secondary MAC, and the configuration of the secondary cell that belongs to the sTAG.

Furthermore, for example, in a case where SCellToReleaseList in which SCellIndex corresponding to the secondary cell that is a release target is configured is received from the base station apparatus 2, the terminal device 1 releases the configuration relating to the secondary cell that corresponds to SCellIndex.

Furthermore, in a case where SCellToReleaseList in which SCellIndex corresponding to the secondary cell that is a release target is configured is received from the base station apparatus 2 and all the secondary cells that belong to the sTAG of the terminal device 1 in the SCG are released from the base station apparatus 2, the terminal device 1 autonomously releases the configuration of the sTAG of the secondary cell.

Furthermore, in a case where SCellToReleaseList in which SCellIndex corresponding to the secondary cell that is a release target is configured is received from the base station apparatus 2 and the secondary cells that belong to the secondary MAC of the terminal device 1 in the SCG are all released, the terminal device 1' autonomously releases each of the configuration of the secondary MAC, the configuration of the sTAG of the secondary cell that belongs to the secondary MAC, and the configuration of the secondary cell that belongs to the sTAG.

Furthermore, in the case where SCellToReleaseList in which SCellIndex corresponding to the secondary cell that is a release target is configured is received from the base station apparatus 2 and all the secondary cells that belong to the secondary MAC of the terminal device 1 in the SCG are released, the terminal device 1' autonomously releases each of the configuration of the secondary MAC, the configuration of the sTAG of the secondary cell that belongs to the secondary MAC, the configuration of the secondary cell that belongs to the sTAG, and the configuration relating to the DRB that corresponds to the secondary MAC.

Because in addition to the advantage that is provided by the terminal device 1 according to the first embodiment, the terminal device 1 according to the present embodiment is able to autonomously perform the deletion of multiple pieces of control information in each of the layers by using multiple identifiers relating to the dual connectivity, the control can be streamlined and the communication control can be further efficiently performed.

Because in addition to the advantage that is provided by the base station apparatus 2 according to the first embodiment, the base station apparatus 2 according to the present embodiment is able to perform the deletion of multiple pieces of control information in each of the layers for the terminal device 1, by using multiple identifiers relating to the dual connectivity, the control can be streamlined and the communication control can be further efficiently performed.

Third Embodiment

A third embodiment of the present invention will be described below.

The first embodiment and the second embodiment assumes the communication that uses a protocol architecture of a first user-plane which is illustrated in FIG. 7, but on the other hand, there is also a need to further assume the communication that uses a protocol architecture of a second user-plane which is illustrated in FIG. 8.

Accordingly, according to the third embodiment, a method of performing efficient communication control using the protocol architecture of the second user-plane is provided. A terminal device 1 and a base station apparatus 2 according to the third embodiment may have the same constitutions as illustrated in FIGS. 1 and 2, respectively.

What distinguishes the protocol architecture of the second user-plane that is illustrated in FIG. 8 from that which is illustrated in FIG. 7 is that, for one DRB, a correspondence relationship between the PDCP layer and the RLC layer is configured for each of the groups (the MCG and the SCG). That is, the terminal device 1 and the base station apparatus 2 need to perform the efficient communication control that uses sMAC-Id, sTAG-Id and SCellIndex, for each configuration for the RLC layer, the MAC layer, and the PHY layer that correspond to the SCG in the dual connectivity, but without exerting any influence on the PDCP layer. In view of these, what needs the communication control different from that according to the first embodiment will be described below.

For example, in the case where the secondary MAC in the SCG is released, the base station apparatus 2 can release a related configuration from the terminal device 1, by configuring each of sMAC-Id, sTAG-Id, and SCellIndex that correspond to the secondary MAC, the sTAG of the secondary cell that belongs to the secondary MAC, and the secondary cell that belongs to the sTAG, respectively, as release targets, and by configuring a configuration relating to the RLC (which is hereafter referred to as a secondary RLC) corresponding to the secondary MAC, among configurations relating to the DRB corresponding to the secondary MAC, as a release target, for transmission.

Moreover, the release of the secondary RLC may be a change of the RLC. At this time, it is desirable that the PDCP and the RLC which correspond to the DRB in the MCG is re-established.

Furthermore, for example, in the case where the DRB in the SCG is released, the base station apparatus 2 can release a related configuration from the terminal device 1, by transmitting DRB-ToReleaseList in which DRB-Id that corresponds to the DRB which is a release target is configured, and by configuring a configuration relating to the secondary RLC corresponding to the secondary MAC, among configurations relating to the DRB, as a release target, for transmission. Moreover, the release of the secondary RLC may be a change of the RLC. At this time, it is desirable that the PDCP and the RLC which correspond to the DRB in the MCG are reestablished.

Furthermore, for example, in the case where the secondary cell in the SCG is released, if the secondary cells that belong to the secondary MAC of the terminal device 1 in the SCG are all released by transmitting SCellToReleaseList in which SCellIndex that corresponds to the secondary cell which is a release target is configured, the base station apparatus 2 can release a related configuration from the terminal device 1 by configuring each of sMAC-Id, sTAG-Id, and SCellIndex that correspond to the secondary MAC, the sTAG of the secondary cell that belongs to the secondary MAC, and the secondary cell that belongs to the sTAG, respectively, as release targets, and by configuring a configuration relating to the secondary RLC corresponding to the secondary MAC, among configurations relating to the DRB that corresponds to the secondary MAC, as a release target, for transmission.

Moreover, the release of the secondary RLC may be a change of the RLC (rlc-Config) that is already configured for the terminal device 1. At this time, it is desirable that the PDCP and the RLC which correspond to the DRB in the MCG is re-established.

Even in a case where the protocol architecture of the second user-plane is used, because the terminal device 1 according to the present embodiment is able to autonomously perform the deletion of multiple pieces of control information for each of the layers by using multiple identifiers relating to the dual connectivity, the control can be streamlined and the communication control can be efficiently performed. Furthermore, based on the protocol architectures of the first and second user-planes that are applied (configured), the terminal device 1 according to the present embodiment can suitably change the transfer path for the user data and the communication control.

Furthermore, even in the case where the protocol architecture of the second user-plane is used, because the base station apparatus 2 according to the present embodiment is able to perform the deletion of multiple pieces of control information for each of the layers, for the terminal device 1, by using multiple identifiers relating to the dual connectivity, the control can be streamlined and the communication control can be efficiently performed. Furthermore, by applying (configuring) any one of the protocol architectures of the first and second user-planes to (for) the terminal device 1, the base station apparatus 2 according to the present embodiment can suitably change the transfer path for the user data of the terminal device 1 and the communication control.

Moreover, the embodiments described above are only simple examples, and can be realized using various modification examples and substituent examples. For example, a communication scheme that is used is also able to be applied to a communication system, such as one in which an FDD (frequency division duplex) scheme, a TDD (time division duplex), or both of the transmission schemes are used for every frequency. Furthermore, because the name of each parameter that is described according to the embodiments is given for convenience of description, even if the name of the parameter that is applied in practice and the name of the parameter according to the embodiments of the present inventions are different from each other, this does not exert any influence on the gist of the invention claimed, in the embodiments of the present invention.

Furthermore, the term "connection" that is used in each embodiment is not limited only to the configuration in which a certain device or apparatus and another certain device or apparatus are connected directly to each other using a physical circuit, and includes the meaning of a configuration in which a connection is made logically or of a configuration in which a wireless connection is made using a wireless technology.

Furthermore, the terminal devices 1 are not limited to portable or movable mobile station apparatus, and include a stationary-type electronic apparatus that is installed indoors or outdoors and a non-movable-type electronic apparatus, for example, an AV apparatus, a kitchen apparatus, a cleaning or washing machine, an air conditioner, office equipment, a vending machine, other household apparatuses or measurement apparatuses, a vehicle-mounted apparatus, and a wearable device, a health care device, or the like that can be worn on a human body, which is equipped with a communication function. Furthermore, the terminal device 1 is used not only for human-to-human or human-to-machine communication, but also for machine-to-machine communication (machine type communication) or device-to-device communication (D2D).

The terminal device 1 is also referred to as a user terminal, a mobile station apparatus, a communication terminal, a mobile device, a terminal, user equipment (UE), and a mobile station (MS). The base station apparatus 2 is also referred to as a wireless base station apparatus, a base station, a wireless base station, a stationary station, a Node B (NB), an evolved Node B (eNB), a base transceiver station (BTS), and a base station (BS).

Moreover, the base station apparatus 2 is referred to as an NB in UMTS that is stipulated by 3GPP, and is referred to as an eNB in EUTRA and Advanced EUTRA. Moreover, the terminal device 1 is referred to as UE in UMTS, EUTRA, and Advanced EUTRA that stipulated by 3GPP.

Furthermore, for convenience of description, a method or means for realizing each of functions of the units of the terminal device 1 and the base station apparatus 2 or some of the functions, or a specific combination of algorithm steps is described, but can be directly embodied by a hardware item, a software module that is implemented by a processor, or a combination of these.

If these are embodied in hardware, in addition to the constitution in block diagrams, which are described, the terminal device 1 and the base station apparatus 2 each are constituted from a power supply device or a battery that supplies power to the terminal device 1 or the base station apparatus 2, a display device such as a liquid crystal device, a display drive device, a memory, an input and output interface, input and output terminals, a speaker, and other peripheral devices.

If these are embodied in software, their functionality can be retained, as one or more commands or codes, on a computer-readable medium, or can be distributed. The computer-readable media include both communication media that include a medium which serves to carry a computer program from a place to another and computer recording media.

Then, one or more commands or codes may be recorded on the computer-readable recording medium and a computer system may be caused to read the one or more commands or codes recorded on the recording medium for execution. Thus, control of the terminal device 1 or the base station apparatus 2 may be performed. Moreover, the "computer system" here is defined as including an OS and hardware components such as a peripheral device.

The operations according to each of the embodiments of the present invention, which are described, may be realized as a program. A program running on the terminal device 1 and the base station apparatus 2 according to each of the embodiments of the present invention is a program (a program for causing the computer to operate) that controls a CPU and the like in such a manner as to realize the functions according to each of the embodiments of the present invention, which are described above. Then, pieces of information that are handled in the device and the apparatus are temporarily stored in a RAM while being processed. Thereafter, the pieces of information are stored in various ROMs or HDDs, and if need arises, is read by the CPU to be modified or written.

Furthermore, in some cases, the functions according to the embodiments described above are realized by executing the program, and in addition, the functions according to each of the embodiments of the present invention are realized by performing processing in conjunction with an operating system or other application programs, based on an instruction from the program.

Furthermore, the expression "computer-readable recording medium" is used to include a portable medium, such as a semiconductor medium (for example, a RAM, a nonvolatile memory card, or the like), an optical storage medium (for example, a DVD, an MO, an MD, a CD, a BD, or the like), or a magnetic medium (for example, a magnetic tape, a flexible disk, or the like), or to include a storage device, such as a disk unit that is built into the computer system. Moreover, the expression "computer-readable recording medium" is defined as including whatever dynamically retains the program for a short period of time, such as a communication line that is used when transmitting the program over a network such as the Internet or over a communication circuit such as a telephone circuit and is defined as including whatever retains the program for a given period of time, such as a volatile memory within the computer system, which functions as a server or a client in the case of retaining the program dynamically.

Furthermore, the program described above may be one for realizing some of the functions described above and additionally may be one that can realize the functions described above in combination with a program that is already recorded on the computer system.

Furthermore, each functional block or features of the terminal device 1 and the base station apparatus 2 according to each of the embodiments, which are described above, can be built into or implemented by a general-purpose processor or a digital signal processor (DSP), which is designed in such a manner as to perform the functions described in the present specification, an application-specific integrated circuit (ASIC), any general-purpose integrated circuit (IC), a field programmable gate-array signal (FPGA), a programmable logic device, a discrete gate, a transistor logic, a discrete hardware component, or combinations of these.

The general-purpose processor may be a microprocessor. Instead, the processor may be a processor in the related art, a controller, a microcontroller, or a state machine. The general-purpose processor or each circuit described above may be constituted from digital circuits, and may be constituted from analog circuits.

Furthermore, the processor may be built as a combination of computing devices. For example, a DSP and a microprocessor, multiple microprocessors, or one or more microprocessor that are connected to a DSP core may be combined, or other combinations may be possible in this manner.

The embodiments of the invention are described in detail above based on the specific examples, but it is apparent that the nature of each of the embodiments of the present invention and a scope of claims are not limited to the specific examples. A change in design and the like that fall within the scope that does not depart from the gist of the invention are also included. That is, the description in the present specification serves the purpose of the disclosure in a descriptive manner, and thus, no limitation is imposed on each of the embodiments of the present invention.

Furthermore, various modifications are possible within the scope of the present invention defined by claims, and embodiments that are made by suitably combining technical means disclosed according to each of the different embodiments are also included in the technical scope of the present invention. Furthermore, a constitution in which a constituent element that achieves the same effect is substituted for the one that is described according to each of the embodiments described above is also included in the technical scope of the present invention.

INDUSTRIAL APPLICABILITY

The present invention can be applied to a mobile phone, a personal computer, a tablet-type computer, and the like.

DESCRIPTION OF REFERENCE NUMERALS

1 TERMINAL DEVICE
2, 2-1, 2-2 BASE STATION APPARATUS
101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT

211 NETWORK SIGNAL TRANSMISSION AND RECEPTION UNIT
R01, R02 RECEIVE ANTENNA UNIT
T01, T02 TRANSMIT ANTENNA UNIT

The invention claimed is:

1. A terminal apparatus configured to be configured with a first cell group and a second cell group, the first cell group containing cells of a first base station apparatus, and the second cell group containing cells of a second base station apparatus, the terminal apparatus comprising;
reception circuitry configured and/or programmed to receive, from the first base station apparatus, a first list of data radio bearers including a first identifier of data radio bearers, a PDCP (packet data convergence protocol) configuration, a first RLC (radio link control) configuration and a second RLC configuration; and
control circuitry configured and/or programmed to establish a PDCP, a first RLC, and a second RLC, wherein
the terminal apparatus communicates with the first base station apparatus and the second base station apparatus using the first RLC, the second RLC, and the PDCP, the first RLC corresponding to the first cell group including at least the primary cell, the second RLC corresponding to the second cell group not including the primary cell, and the PDCP being configured to process first data of the first RLC and second data of the second RLC,
in a case that the reception circuitry receives a second list of data radio bearers including a second identifier of data radio bearers being used for both the first cell group and the second cell group,
the control circuitry is configured and/or programmed to release the second RLC corresponding to the second identifier included in the second list.

2. A communication control method for a terminal apparatus configured to be configured with a first cell group and a second cell group, the first cell group containing cells of a first base station apparatus, and the second cell group containing cells of a second base station apparatus, the communication control method comprising;
first base station apparatus, a first list of data radio bearers including a first identifier of data radio bearers, a PDCP configuration (packet data convergence protocol), a first RLC (radio link control) configuration and a second RLC configuration; and
establishing a PDCP, a first RLC, and a second RLC, wherein
the terminal apparatus communicates with the first base station apparatus and the second base station apparatus using the first RLC, the second RLC, and the PDCP, the first RLC corresponding to a first cell group including at least the primary cell, the second RLC corresponding to a second cell group not including the primary cell, and the PDCP being configured to process first data of the first RLC and second data of the second RLC,
in a case that receiving, from the base station apparatus, a second list of data radio bearers including a second identifier of data radio bearers being used for both the first cell group and the second cell group,
releasing the second RLC corresponding to the second identifier included in the second list.

3. A base station apparatus configured to establish a connection with a terminal apparatus using a plurality of serving cells including a primary cell, the base station apparatus comprising;
control circuitry configured and/or programmed to establish a PDCP (packet data convergence protocol), a first RLC (radio link control), and a second RLC, and configured and/or programmed to transmit, to the terminal apparatus, a first list of data radio bearers including a first identifier of data radio bearers, a PDCP configuration, a first RLC configuration and a second RLC configuration; wherein,
in a case that the base station apparatus communicates with the terminal apparatus using the first RLC, the second RLC, and the PDCP, the first RLC corresponding to a first cell group including at least the primary cell, the second RLC corresponding to a second cell group not including the primary cell, and the PDCP being configured to process first data of the first RLC and second data of the second RLC,
the control circuitry is configured and/or programmed to generate a second list of data radio bearers including a second identifier of data radio bearers being used for both the first cell group and the second cell group, and
the transmission circuitry is configured and/or programmed to transmit, to the terminal apparatus, the second list to release the second RLC corresponding to the second identifier included in the second list.

4. A communication control method for a base station apparatus configured to establish a connection with a terminal apparatus using a plurality of serving cells including a primary cell, the communication control method comprising;
establishing a PDCP (packet data convergence protocol), a first RLC (radio link control) and a second RLC; and
transmitting, to the terminal apparatus, a first list of data radio bearers including a first identifier of data radio bearers, a PDCP configuration, a first RLC configuration and a second RLC configuration; wherein
the base station apparatus communicates with the terminal apparatus using the first RLC, the second RLC, and the PDCP, the first RLC corresponding to a first cell group including at least the primary cell, the second RLC corresponding to a second cell group not including the primary cell, and the PDCP being configured to process first data of the first RLC and second data of the second RLC,
generating a second list of data radio bearers including a second identifier of data radio bearers being used for both the first cell group and the second cell group, and
transmitting, to the terminal apparatus, a second list to release the second RLC corresponding to the second identifier included in the second list.

* * * * *